US012794973B2

(12) United States Patent
Kindo

(10) Patent No.: US 12,794,973 B2
(45) Date of Patent: Nov. 10, 2026

(54) WIRELESS COMMUNICATION DEVICE, WIRELESS COMMUNICATION METHOD, AND STORAGE MEDIUM

(71) Applicant: PANASONIC AUTOMOTIVE SYSTEMS CO., LTD., Kanagawa (JP)

(72) Inventor: Tsuyoshi Kindo, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 225 days.

(21) Appl. No.: 18/755,024

(22) Filed: Jun. 26, 2024

(65) Prior Publication Data

US 2025/0007977 A1 Jan. 2, 2025

(30) Foreign Application Priority Data

Jun. 30, 2023 (JP) ................................ 2023-108795

(51) Int. Cl.
*H04L 67/104* (2022.01)
*H04L 67/1074* (2022.01)

(52) U.S. Cl.
CPC ...... *H04L 67/1046* (2013.01); *H04L 67/1074* (2013.01)

(58) Field of Classification Search
CPC ........................ H04L 67/1046; H04L 67/1074
USPC .......................................................... 710/105
See application file for complete search history.

(56) References Cited

U.S. PATENT DOCUMENTS 7,555,264 B2 * 6/2009 Ishiwata ............... H04W 84/20 455/39
10,988,113 B2 * 4/2021 Hassani .................. H04W 4/40
2006/0072525 A1 * 4/2006 Hillyard ................ H04W 84/20 370/338
2016/0353395 A1 12/2016 Kawagishi et al.
2023/0208892 A1 * 6/2023 Goldfish ............... G06F 13/102 455/41.2

FOREIGN PATENT DOCUMENTS

JP 2009290715 A 12/2009
JP 5976259 B2 8/2016

* cited by examiner

*Primary Examiner* — Brian T Misiura
(74) *Attorney, Agent, or Firm* — Seed Intellectual Property Law Group LLP

(57) ABSTRACT

A wireless communication device includes a communication circuit for performing communication with a plurality of remote devices in a mode of central or peripheral and a processor. When the remote devices are connected to the communication circuit by communication of a same standard and a number of the remote devices is less than L+1, the processor accepts an acquisition request for the central from the remote devices and sets a role of the communication circuit with respect to the remote devices to the peripheral. When the remote devices are connected to the communication circuit by communication of the same standard and a number of the remote devices is L+1 or more, the processor rejects the acquisition request for the central from the remote devices and sets the role of the communication circuit with respect to the remote devices to the central.

13 Claims, 13 Drawing Sheets

WIRELESS COMMUNICATION DEVICE, WIRELESS COMMUNICATION METHOD, AND STORAGE MEDIUM

TECHNICAL FIELD

The present disclosure relates to a wireless communication device, a wireless communication method, and a computer readable storage medium.

BACKGROUND ART

Patent Literature 1 discloses a wireless communication system including a communication unit capable of communicating with a communication terminal using a plurality of profiles including a first profile related to a hands-free call and a second profile related to audio. In addition, the wireless communication system includes a control unit that prohibits a role of the communication unit from being switched from a master to a slave when extended Synchronous Connection Oriented is not included in packet information transmitted, to the communication unit, from the communication terminal communicating with the communication unit.

CITATION LIST

Patent Literature

Patent Literature 1: Japanese Patent No. 5976259

SUMMARY OF INVENTION

In recent years, connection of a communication device with a plurality of remote devices has been taken into consideration, and there are many cases where each of the devices wants to take central of communication. A wireless communication device is, for example, an in-vehicle device. The remote device is, for example, a smart phone. The wireless communication device and the remote device are not limited to the above-described examples.

In Patent Literature 1, a communication device performs role switch for switching a role from central to peripheral or from the peripheral to the central depending on whether a remote device for communication is compatible with extended Synchronous Connection Oriented.

However, in recent years, extended synchronous connection oriented has been compatible with many remote devices. Therefore, the communication device becomes the peripheral with respect to a plurality of remote devices, and there is a risk that deterioration in performance such as a decrease in communication speed, an increase in communication delay amount, or a decrease in connection stability occurs.

The present disclosure has been made in view of the above-described situation in the related art, and an object thereof is to suppress deterioration in performance of communication while considering a request from a remote device.

The present disclosure provides a wireless communication device including a communication circuit that performs communication with a plurality of remote devices in a mode of central or peripheral, the plurality of remote devices including one or more remote devices connected to the communication circuit; a memory storing instructions; and a processor. The processor executes the instructions to accept an acquisition request for the central from the one or more remote devices and set a role of the communication circuit with respect to the one or more remote devices to the peripheral when the one or more remote devices are connected to the communication circuit by communication of a same standard and a number of the one or more remote devices is less than L+1, where L is an integer of 1 or more. Further, when the one or more remote devices are connected to the communication circuit by communication of the same standard and the number of the one or more remote devices is L+1 or more, the processor executes the instructions to reject the acquisition request for the central from the one or more remote devices and set the role of the communication circuit with respect to the one or more remote devices to the central.

Further, the present disclosure a wireless communication method including performing communication in a mode of central or peripheral with respect to a plurality of remote devices, the plurality of remote devices including one or more remote devices connected to a communication circuit; when the one or more remote devices are connected to the communication circuit by a same standard and a number of the one or more remote devices is less than L+1, where L is integer of 1 or more, accepting an acquisition request for the central from the one or more remote devices and setting a role of the communication circuit with respect to the one or more remote devices to the peripheral; and when the one or more remote devices are connected to the communication circuit by the same standard and the number of the one or more remote devices is L+1 or more, rejecting the acquisition request for the central from the one or more remote devices and setting the role of the communication circuit with respect to the one or more remote devices to the central.

Further, the present disclosure provides a computer readable storage medium on which a program is stored. The program for causing a wireless communication device which is a computer to execute processing of performing communication in a mode of central or peripheral with respect to a plurality of remote devices, the plurality of remote devices including one or more remote devices connected to a communication circuit; when the one or more remote devices are connected to the communication circuit by a same standard and a number of the one or more remote devices is less than L+1, where L is an integer of 1 or more, processing of accepting an acquisition request for the central from the one or more remote devices and setting a role of the communication circuit with respect to the one or more remote devices to the peripheral; and when the one or more remote devices are connected to the communication circuit by communication of the same standard and the number of the one or more remote devices is L+1 or more, processing of rejecting the acquisition request for the central from the one or more remote devices and setting the role of the communication circuit with respect to the one or more remote devices to the central.

According to the present invention, it is possible to suppress deterioration in performance of an own device while giving certain consideration to a remote device side.

DESCRIPTION OF EMBODIMENTS

Figure 1:
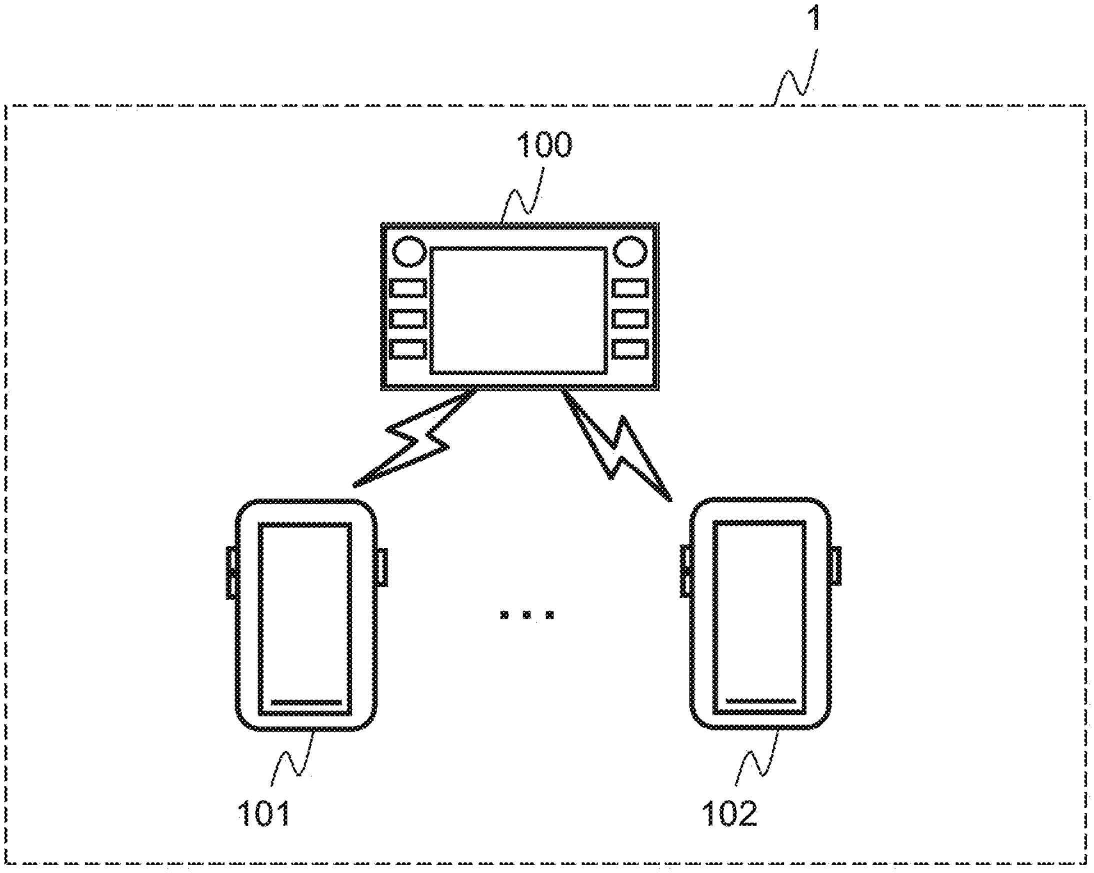
FIG. 1 is a diagram illustrating a configuration example of a wireless communication system according to a first embodiment.

Hereinafter, embodiments in which a wireless communication device, a control method of the wireless communication device, and a program according to the present disclosure are specifically disclosed will be described in detail with reference to the drawings. However, more detailed descriptions may be omitted. For example, detailed description of already well-known matters and redundant description of substantially the same configuration may be omitted. This is to avoid unnecessary redundancy of the following description and to facilitate understanding of those skilled in the art. The accompanying drawings and the following description are provided for those skilled in the art to fully understand the present disclosure, and are not intended to limit the subject matter described in the claims.

Bluetooth (registered trademark) is one of near field communication standards, and includes Bluetooth Classic (Basic Rate/Enhanced Data Rate: BR/EDR) and Bluetooth Low Energy. Hereinafter, Bluetooth is referred to as "BT", Bluetooth Classic is referred to as "Classic", and Bluetooth Low Energy is referred to as "BLE".

In Classic, each device plays a role of central or peripheral in a unit called a piconet to perform communication. The central is a device that takes initiative of communication, and the number of peripherals that can be simultaneously connected to the central is up to seven. In addition, a device operating as the central is allowed to operate as peripheral of another piconet at the same time, and this topology is called "Scatternet".

Similarly, BLE has two types of roles including central and peripheral. The central controls the traffic on the piconet physical channel by a polling in BLE similarly to Classic. In addition, one peripheral may simultaneously establish a connection with a plurality of centrals.

In the case of simultaneous connection with a plurality of BT devices, when an own device becomes peripheral for each of the plurality of remote devices, it is necessary to identify different Bluetooth clocks for the plurality of remote devices and to maintain and manage the clocks as independent clocks. Therefore, it is known that, although depending on performance and execution of a BT controller, deterioration in performance such as a decrease in communication speed, an increase in communication delay amount, and a decrease in connection stability occurs. The deterioration in performance may lead to a link loss between the own device and the remote device.

In Classic, it is possible to request another device, which is being connected, to switch the role from the central to the peripheral or from the peripheral to the central. The switch of the role is called role switch. The device requiring role switch can accept or reject the request.

In the related art, there is a wireless communication device capable of communicating with a communication terminal by Classic using a plurality of profiles including a first profile related to a hands-free call and a second profile related to audio. There is known a wireless communication device that prohibits a role of a communication unit from being switched from central to peripheral when extended Synchronous Connection Oriented is not included in packet information transmitted from a remote device in communication (for example, see Patent Literature 1). A role on a Classic side up to Bluetooth Core Specification Version 5.2 is called master for the central and slave for the peripheral. In Bluetooth Core Specification Version 5.3 and thereafter, the role on the Classic side is also unified as the central and the peripheral in accordance with BLE. In the text, the central and the peripheral are used as the role on the Classic side.

In recent years, connection between a plurality of devices and both a wireless communication device and a remote device has been taken into consideration, and there are many cases where each of the devices wants to take central of communication. For example, there is a case in which an in-vehicle device, which is an example of a wireless communication device, is simultaneously connected with a total of four remote devices such as one main device which supports a Hands Free Profile (hereinafter, referred to as "HFP"), one sub device, one device which supports an Advanced Audio Distribution Profile (hereinafter, referred to as "A2DP")/A/V Remote Control Profile (hereinafter, referred to as "AVRCP"), and one device which supports a Serial Port Profile (hereinafter, referred to as "SPP"). On the other hand, there is a case in which a smart phone, which is an example of a remote device, is simultaneously connected with a wearable device such as a smart watch, an accessory device such as an earphone, or an in-vehicle device. When the smart phone wants to take the central, the smart phone requests a role change from the peripheral to the central by sending a role switch command to the in-vehicle device, and requests that the request for role change is accepted. Hereinafter, an in-vehicle device may be described as an example of the wireless communication device, and a smart phone may be described as an example of the remote device.

On the other hand, execution of an in-vehicle device for unlimitedly rejecting role switch is the mainstream. When both the in-vehicle device and the smart phone want to take the central, there is also a risk that a request for role switch is repeated and communication becomes impossible.

In addition, there are a case of connection from the in-vehicle device to the remote device and a case in which the in-vehicle device receives connection from a remote device side to the in-vehicle device. Connection from the in-vehicle device to the remote device is referred to as initiating connection. Acceptance, by the in-vehicle device, of the connection from the remote device side to the in-vehicle device is referred to as responding connection. Normally, a side requesting connection becomes the central, and in the case of salve connection, the in-vehicle device becomes the peripheral.

In addition, although Classic and BLE do not have compatibility in communication, Classic and BLE use the same 2.4 GHz band, and use in a dual mode in which Classic and BLE operate simultaneously is increasing. For example, there is a case in which the in-vehicle device operates in the dual mode, connects to and communicates with a plurality of remote devices by Classic, and connects to and communicates with a plurality of remote devices as the peripheral of BLE. In this way, when the in-vehicle device performs communication in the dual mode, the performance of communication of Classic may deteriorate in order to maintain and manage communication of BLE. In particular, since there is no concept of role switch in BLE, the in-vehicle device continues to maintain the peripheral once being connected with the peripheral of BLE.

In the wireless communication device in the related art described in Patent Literature 1, there are two remote devices, and in a case of HFP connection with the first remote device and Personal Area Networking Profile connection with the second remote device, acceptance and rejection of role switch with the second remote device are switched depending on whether the first remote device is compatible with the extended Synchronous Connection Oriented (eSCO). The wireless communication device performs an operation of accepting role switch when the remote device is compatible with the extended Synchronous Connection Oriented (eSCO) and rejecting role switch when the remote device is not compatible with the extended Synchronous Connection Oriented (eSCO). Recently, almost all smart phones are compatible with the extended Synchronous Connection Oriented (eSCO). Therefore, in the wireless communication device, when the first smart phone is compatible with the extended Synchronous Connection Oriented (eSCO), role switch is accepted regardless of the number of the second and subsequent smart phones, and the above-described influence on the performance is unavoidable.

The present disclosure has been made to solve such a problem in the related art, and it is possible to avoid a situation in which a request for role switch for requesting acquisition of central from both a wireless communication device and a remote device is repeated corresponding to each of a case at the time of initiating connection and a case at the time of responding connection. An object of the present disclosure is to provide a wireless communication device that suppresses deterioration in performance of communication while considering a request from a remote device, even in a case of communication of only Classic and communication of a dual mode in which Classic and BLE operate simultaneously.

First Embodiment

Hereinafter, a wireless communication system according to a first embodiment of the present invention will be described with reference to the drawings. FIG. 1 is a diagram illustrating a configuration example of a wireless communication system 1 according to the first embodiment.

In FIG. 1, the wireless communication system 1 includes a wireless communication device 100, a remote device 101, and a remote device 102.

The wireless communication device 100 is, for example, an in-vehicle device mounted on a vehicle. The wireless communication device 100 performs wireless communication with the remote device 101 and the remote device 102 based on Classic.

The remote device 101 and the remote device 102 are terminal devices such as smart phones owned by a user. The user is, for example, a driver of the vehicle or a passenger of the vehicle. The remote device 101 and the remote device 102 are carried into a vehicle on which the wireless communication device 100 is mounted or near the vehicle. The remote device 101 and the remote device 102 are not limited to smart phones, and may be tablet terminals, mobile phones, audio players, or the like. The number of the remote device 101 and the remote device 102 is not limited to two, and may be one or more.

Figure 2:
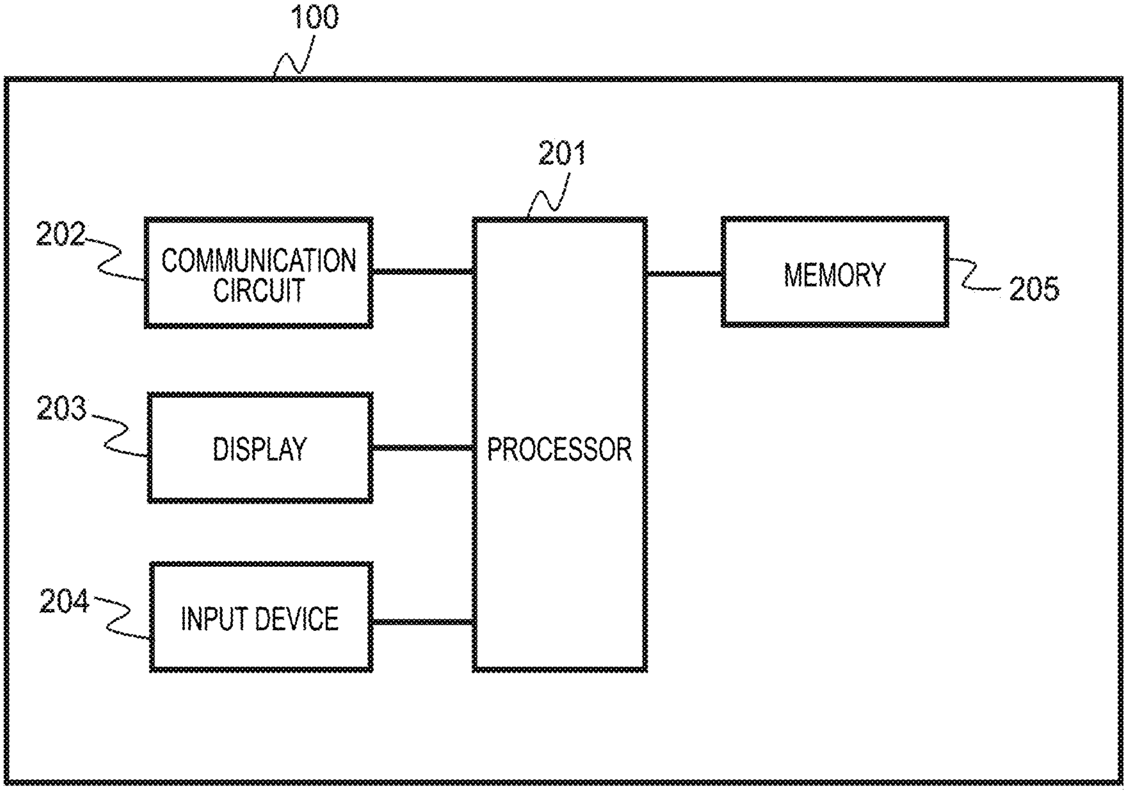
FIG. 2 is a block diagram illustrating a hardware configuration of a wireless communication device according to the first embodiment.

Next, a hardware configuration of the wireless communication device 100 according to the first embodiment will be described with reference to FIG. 2. FIG. 2 is a block diagram illustrating the hardware configuration of the wireless communication device 100 according to the first embodiment.

The wireless communication device 100 includes a processor 201, a communication circuit 202, a display 203, an input device 204, and a memory 205.

The processor 201 controls an overall operation of the wireless communication device 100. The processor 201 is, for example, a central processing unit, a micro processing unit, a digital signal processor, a graphical processing unit, or a field programmable gate array. The processor 201 executes a program stored in a read only memory (hereinafter, referred to as "ROM"), so that the functional blocks cooperate with one another to execute processes according to the present embodiment. The processor 201 uses a RAM as a work area during execution of the program. The ROM or the RAM may be provided outside the processor 201. The outside of the processor 201 is, for example, the memory 205. In addition to or instead of the processor 201, the outside of the processor may be configured by an application specific integrated circuit (ASIC) or the like.

The communication circuit 202 includes, for example, a radio frequency (RF) circuit, a baseband (BB) circuit, a link layer (LL) circuit, a memory circuit, and an antenna. The communication circuit 202 demodulates and combines wireless signals received via the antenna and sends the resultant signal to the processor 201. The communication circuit 202 encodes and modulates a signal sent from the processor 201, and wirelessly transmits the signal via the antenna. In the present embodiment, the communication circuit 202 is executed by a controller that transmits and receives a wireless signal based on BT. The controller that transmits and receives a wireless signal based on BT is, for example, a combo module integrated with BT/WiFi or a BT module including only BT.

The display 203 is a display device such as a liquid crystal display or an organic electro-luminescent display, and includes a circuit for drawing. The display 203 displays, for example, information related to various applications and information received from the remote device 101 and the remote device 102.

The input device 204 inputs an instruction from a user such as connection or disconnection with the remote device 101 and the remote device 102. The input device 204 includes, for example, a configuration in which a predetermined number of press type switches are arranged, and a touch panel type. The input device 204 sends an electric signal corresponding to the input operation to the processor 201. For example, in the input device 204, a touch sensor may be provided to overlap a display panel of the display 203, and the touch sensor may constitute a touch panel together with the display panel. In this case, the touch sensor which is the input device 204 detects a contact position and a contact mode related to a contact operation of the user on the touch sensor, and sends a signal corresponding to the detected contact position and contact mode to the processor 201.

The memory 205 is configured using, for example, a RAM and a ROM, and temporarily holds a control program for the wireless communication device 100 to perform control according to the present embodiment, initial setting data, various variable data during execution of the control program, and data generated during operation.

Although hardware configurations of the remote device 101 and the remote device 102 are omitted, a communication circuit, a processor, a display, and an input device similar to those of the wireless communication device 100 are provided at the minimum.

Figure 3:
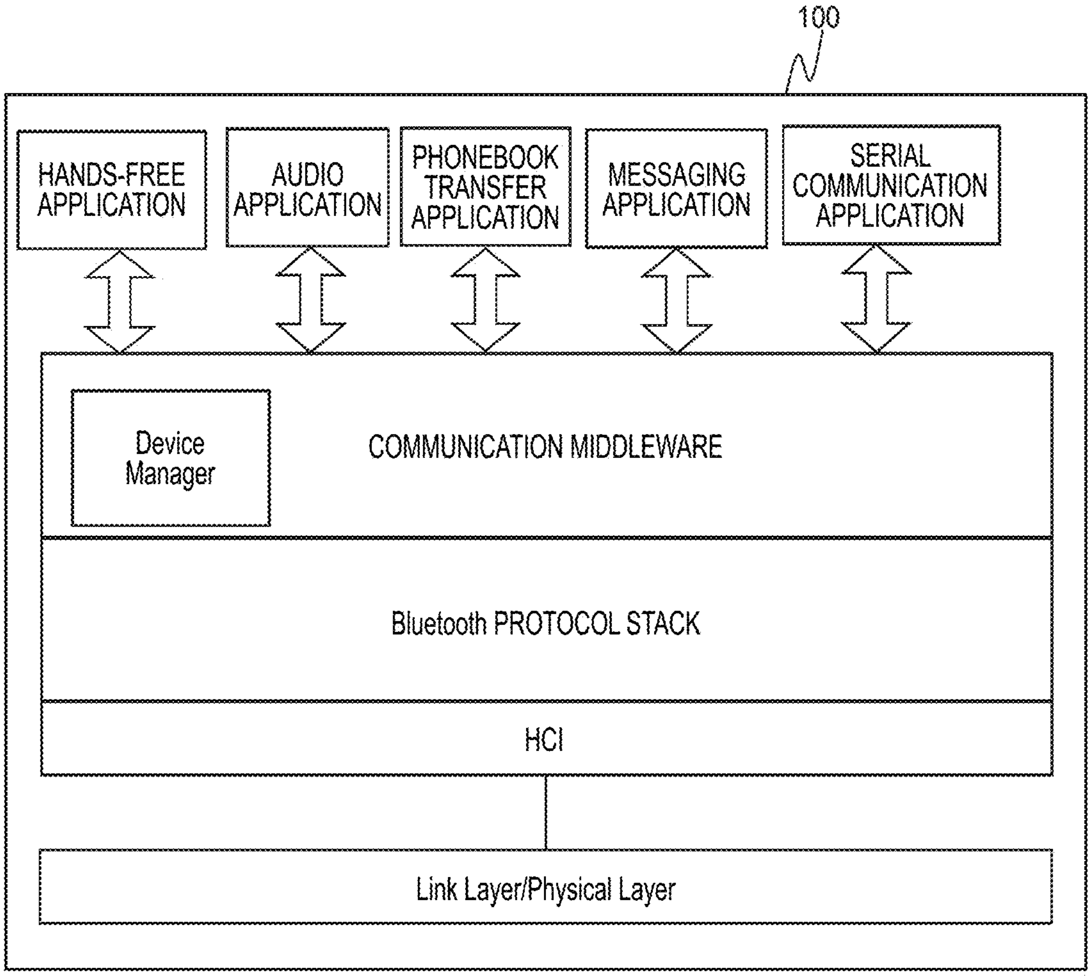
FIG. 3 is a diagram illustrating a hierarchical structure of a software program of the wireless communication device according to the first embodiment.

Next, a software configuration of the wireless communication device 100 will be described with reference to FIG. 3. FIG. 3 is a diagram illustrating a hierarchical structure of a software program of the wireless communication device 100 according to the first embodiment.

In FIG. 3, the wireless communication device 100 includes various applications such as a hands-free application, an audio application, a phonebook transfer application, a messaging application, and a serial communication application, and software including communication middleware, a Bluetooth protocol stack, and a Host Controller Interface (hereinafter referred to as "HCI").

The hands-free application is an application that uses HFP and performs a hands-free call between the wireless communication device 100 and the remote device 101 and/or the remote device 102. By using the hands-free application, the wireless communication device 100 can simultaneously make a hands-free connection with the remote device 101 and the remote device 102, for example, and can receive an incoming call from the remote device 101 and the remote device 102.

The audio application is an application that uses A2DP/AVRCP and performs remote control such as reproduction and reproduction/stop of audio sent from the remote device 101 and/or the remote device 102.

The phonebook transfer application is an application that uses a Phone Book Access Profile (hereinafter referred to as "PBAP") and performs transfer of a phonebook and a history of outgoing calls and incoming calls with the remote device 101 and/or the remote device 102.

The messaging application is an application that uses a Message Access Profile (hereinafter, referred to as "MAP") and performs reception and transmission of a message such as SMS or E-mail with the remote device 101 and/or the remote device 102.

The serial communication application is an application that uses SPP and performs serial communication by the wireless communication device 100 and the remote device 101 and/or the remote device 102 cooperating with each other. The serial communication application is not limited to one, and a plurality of applications may be provided for each application.

The Link Layer/Physical Layer is hardware and is a BT controller corresponding to the communication circuit 202.

The HCI provides a command/event interface for accessing the controller from the host stack, and controls BT communication based on an HCI command, an HCI event, and configuration parameters thereof. Role switch control is also performed by the processor 201 controlling the BT controller via the HCI.

The Bluetooth protocol stack is a protocol stack such as Logical Link Control and Adaptation Protocol (hereinafter referred to as "L2CAP"), RFCOMM, or Object Exchange (hereinafter referred to as "OBEX"). The L2CAP provides functions such as division and reconfiguration of a communication packet of an upper layer protocol. The RFCOMM is used to set a serial cable and emulate an RS-232C serial port. OBEX is mainly used in PBAP and MAP, and is defined so that various data and commands including a phonebook can be exchanged.

The communication middleware is software that relays the Bluetooth protocol stack and various applications. Here, "Device Manager" is a software block that belongs to the communication middleware and performs role switch control according to the first embodiment.

A process performed by the Device Manager is performed on a communication layer under the communication middleware, and the process is concealed when viewed from an upper side. That is, the various applications at a higher level are configured to perform communication without being aware of the role of the wireless communication device 100, the role of the remote device 101 and the remote device 102, and the role switch control.

A processing operation of the wireless communication device 100 configured as described above will be described below. First, a processing operation of performing role switch control of the wireless communication device 100 will be described with reference to FIGS. 4 to 7.

Figure 4:
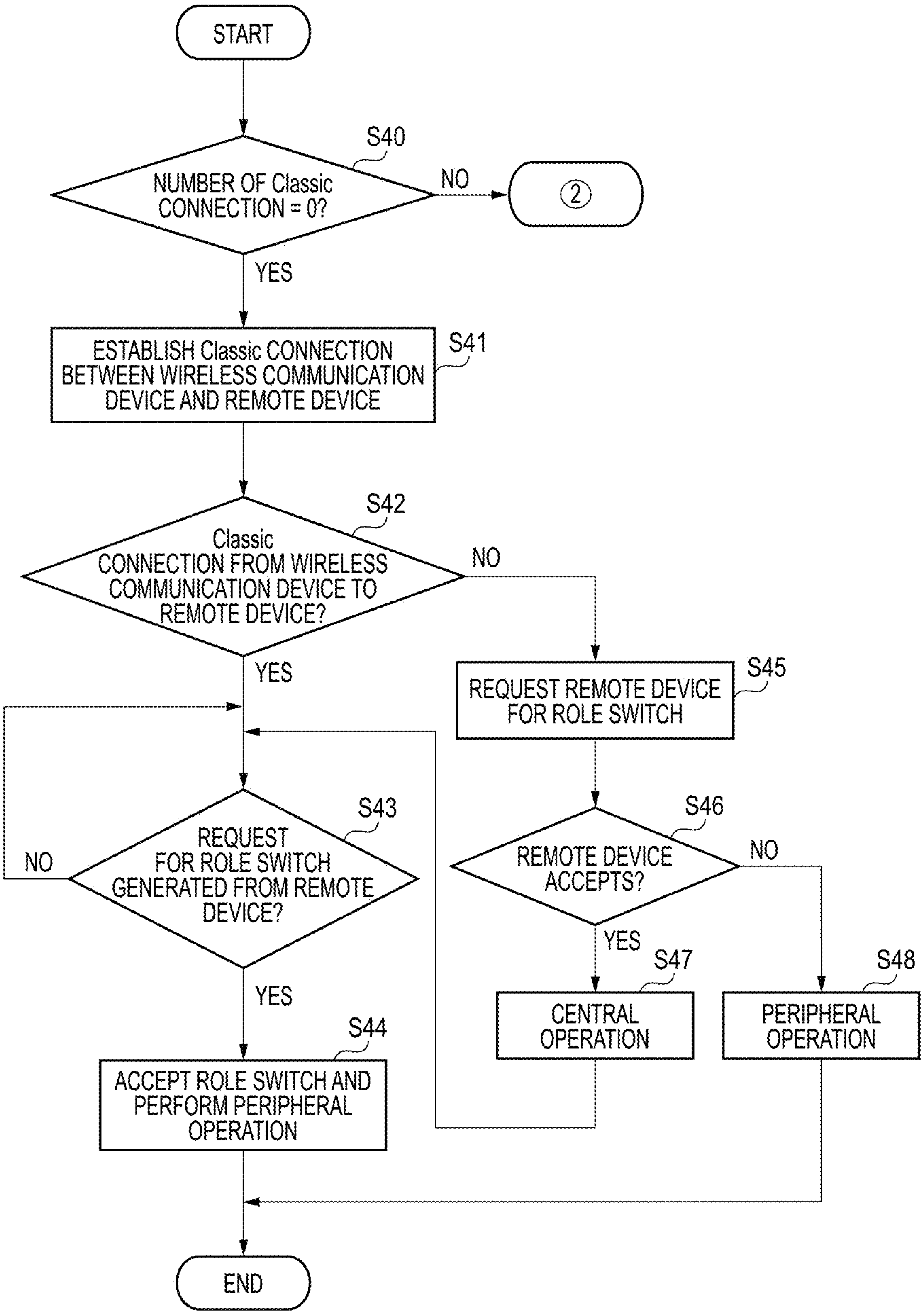
FIG. 4 is a flowchart illustrating processes of role switch control when the number of Classic connection is zero.

FIG. 4 is a flowchart illustrating processes of the role switch control when the number of Classic connection is zero. Each process of the flowchart illustrated in FIG. 4 is performed by the Device Manager operating on the processor 201. In FIGS. 4, 5, 6, 7, 9, 10, 11, 12, and 13, the processes will be described as processes performed by the processor 201 for convenience of description.

First, the processor 201 determines whether the number of the remote devices to which the wireless communication device 100 is connected by Classic is zero (S40). The remote device is, for example, the remote device 101 or the remote device 102. Hereinafter, the BT connection between the wireless communication device 100 and the remote device by Classic is referred to as Classic connection. The number of Classic connected remote devices is referred to as the number of Classic connection.

Figure 5:
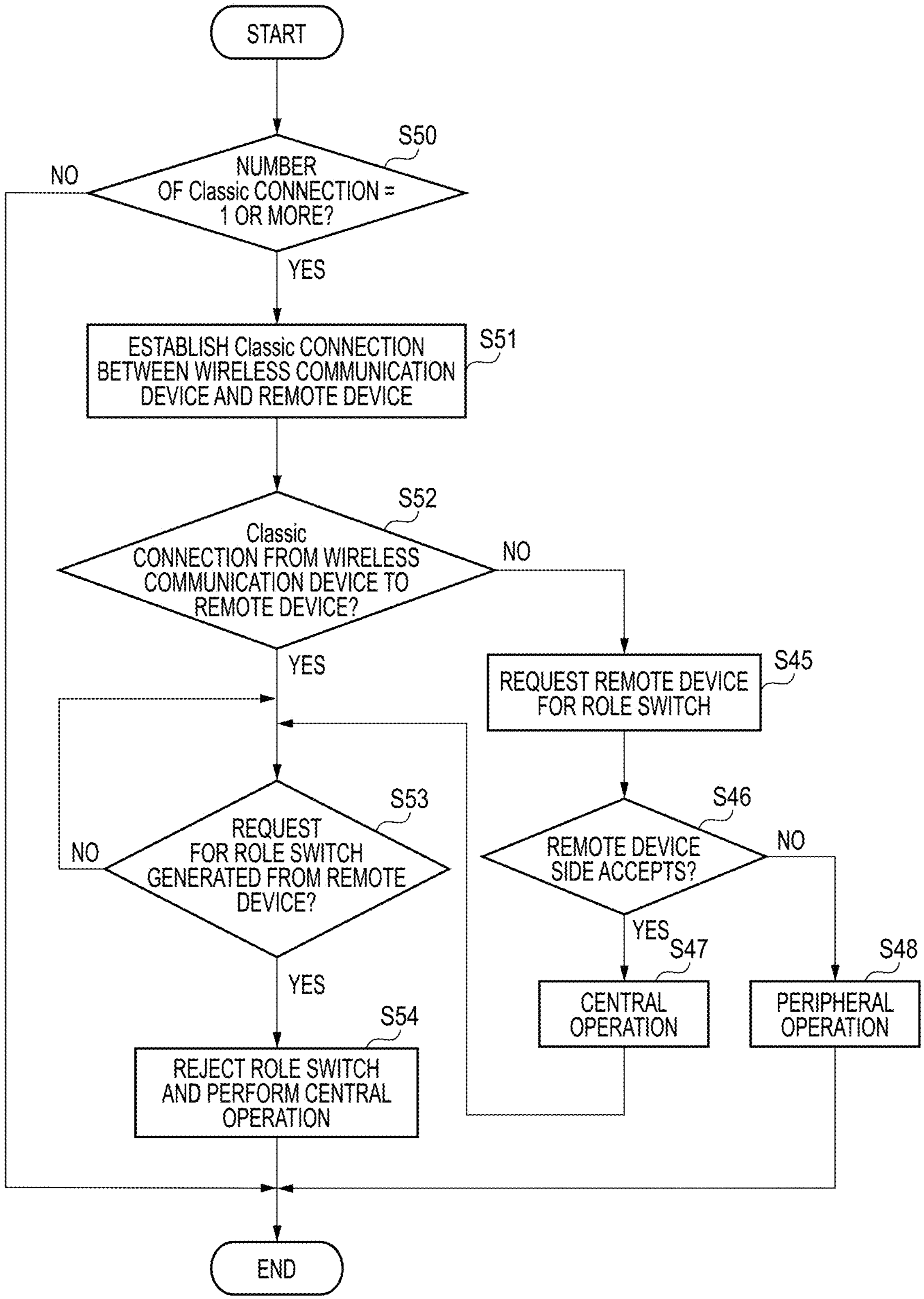
FIG. 5 is a flowchart illustrating processes of role switch control when the number of Classic connection is one.

When it is determined that the number of Classic connection is not zero (NO in S40), the processor 201 transitions to processes illustrated in FIG. 5.

Next, when it is determined that the number of Classic connection is zero (YES in S40), the processor 201 establishes Classic connection between the wireless communication device 100 and the remote device (S41).

In the process of step S41, the processor 201 determines whether to be Classic connection from the wireless communication device 100 to the remote device (S42).

When it is determined not to be Classic connection from the wireless communication device 100 to the remote device, that is, to be Classic connection from the remote device to the wireless communication device 100 (NO in S42), the processor 201 requests the remote device for role switch for setting the role of the communication circuit 202 of the wireless communication device 100 from the peripheral to the central (S45). The number of times the remote device is requested for role switch may be set to a predetermined number of times (for example, twice or three times) by a designer or the like of the wireless communication system 1. The predetermined number of times is preferably once or less.

The processor 201 determines whether the remote device accepts the request for role switch (S46).

When it is determined that the remote device accepts the request for role switch (YES in S46), the processor 201 sets the role of the communication circuit 202 of the wireless communication device 100 with respect to the remote device from the peripheral to the central (S47). Hereinafter, an operation in which the communication circuit 202 of the wireless communication device 100 operates as the central with respect to the remote device is referred to as a central operation. After the process of step S47, the processor 201 executes the process of step S43.

When it is determined that the remote device does not accept the request for role switch (NO in S46), the processor 201 keeps the role of the communication circuit 202 of the wireless communication device 100 with respect to the remote device as the peripheral (S48). Hereinafter, an operation in which the communication circuit 202 of the wireless communication device 100 operates as the peripheral with respect to the remote device is referred to as a peripheral operation. After the process of step S48, the processor 201 ends the process.

When it is determined to be Classic connection from the wireless communication device 100 to the remote device (YES in S42), the processor 201 determines whether a request for role switch in which the remote device is set to the central is generated from the remote device (S43). The processor 201 determines whether a request for role switch is generated by determining whether a signal of the request for role switch in which the remote device is set to the central (LMP_switch_req) is received from the remote device.

When it is determined that the request for role switch is not generated (NO in S43), the processor 201 keeps the wireless communication device 100 as the central with respect to the remote device. After the process of NO in step S43, the processor 201 performs the process of step S43 again. For example, after the process of NO in step S43, the processor 201 may perform the process of step S43 again after a predetermined time elapses. Even in a case in which the role of the communication circuit 202 with respect to the remote device is set to the central, when there is a role switch request from the remote device while the wireless communication device 100 and the remote device maintain point to point connection, the process of the processor 201 is returned to before step S43 to accept the role switch request. On the other hand, in a case of point to point connection with the remote device, the wireless communication device 100 becomes the central unless the request for role switch is received from the remote device.

When it is determined that the request for role switch is generated (YES in S43), the processor 201 accepts role switch, sets the communication circuit 202 of the wireless communication device 100 to the peripheral with respect to the remote device, and performs the peripheral operation (S44). When there is no change in the number of connected remote devices after transition to the peripheral with respect to the remote device, the wireless communication device 100 does not issue, to the remote device, the request for role switch in which the wireless communication device 100 is set to the central. That is, after accepting the request for role switch from the remote device, the processor 201 controls the communication circuit 202 so that the communication circuit 202 does not send an acquisition request for the central to the remote device.

Accordingly, in a case of one-to-one connection with the remote device and in a case of Classic initiating connection, the wireless communication device 100 according to the first embodiment can accepts role switch in response to the role switch request from the remote device and set the role of the communication circuit 202 to the peripheral. That is, the wireless communication device 100 can accept the role switch request of the remote device when the number of remote devices to be connected is as small as one and there is a low possibility that the communication performance deteriorates. Thereby, the wireless communication device 100 can improve convenience of a user who owns the remote device. Accordingly, it is possible to suppress deterioration in performance on a remote device side.

In a case of Classic responding connection, the wireless communication device 100 can request the remote device to perform role switch from the peripheral to the central a predetermined number of times. Accordingly, when the remote device accepts role switch, the wireless communication device 100 can set the role of the communication circuit 202 to the central, and can improve the stability of the performance of communication. At the same time, the wireless communication device 100 can set the number of times of requesting role switch to a predetermined number of times such as once, thereby preventing the request for role switch for the remote device from being repeated and the performance of communication from being deteriorated.

Next, processes of role switch control when the number of Classic connection is one will be described with reference to FIG. 5. FIG. 5 is a flowchart illustrating the processes of role switch control when the number of Classic connection is one. In FIG. 5, the same reference numerals as those in FIG. 4 are given to the same processes as those in FIG. 4, and the description thereof will be omitted.

The processor 201 determines whether the number of Classic connection is one or more (S50).

When it is determined that the number of Classic connection is not one or more (NO in S50), the processor 201 ends the process.

When it is determined that the number of Classic connection is one or more (YES in S50), the processor 201 establishes Classic connection between the wireless communication device 100 and the remote device (S51).

In the process of step S51, the processor 201 determines whether to be Classic connection from the wireless communication device 100 to the remote device (S52).

When it is determined not to be Classic connection from the wireless communication device 100 to the remote device, that is, to be Classic connection from the remote device to the wireless communication device 100 (NO in S52), the processor 201 executes the process of step S45. The processes of steps S45, S46, S47, and S48 are the same as those of the flowchart in FIG. 4. Even in a case in which the wireless communication device 100 becomes the central in the process of step S47, when a request for role switch is received from the remote device while the wireless communication device 100 and the remote device maintain one-to-two or more connection, the processor 201 executes the process of step S53 in order to reject the request for role switch.

When it is determined to be Classic connection from the wireless communication device 100 to the remote device (YES in S52), the processor 201 determines whether the request for role switch in which the remote device is set to the central is generated from the remote device (S53).

When it is determined that the request for role switch is not generated (NO in S53), the processor 201 performs the process of step S53 again while keeping the wireless communication device 100 as the central with respect to the remote device. For example, after the process of NO in step S53, the processor 201 may perform the process of step S53 again after a predetermined time elapses.

When it is determined that the request for role switch is generated (YES in S53), the processor 201 rejects the request for role switch from the remote device, and performs the central operation without performing role switch of the wireless communication device 100 (S54).

Accordingly, in a case of connection with the remote device on a one-to-two or more basis and Classic initiating connection, even when the request for role switch from the remote device exists, the wireless communication device 100 can reject the request for role switch and maintain the central. In other words, the wireless communication device 100 becomes the peripheral with respect to each of a plurality of remote devices, and can prevent deterioration in the performance of communication.

Figure 6:
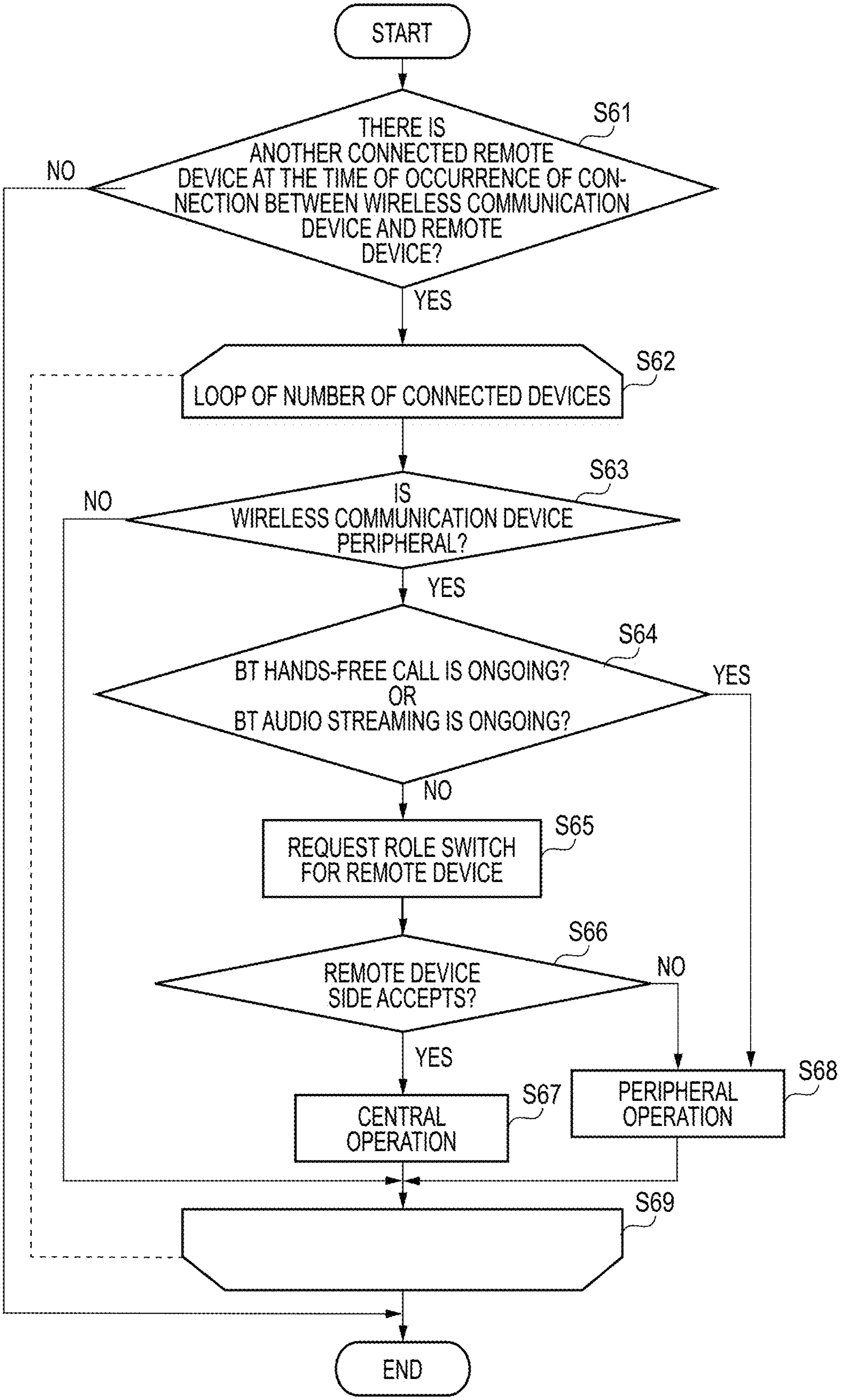
FIG. 6 is a flowchart illustrating processes in a case in which at the time of occurrence of Classic initiating connection or Classic responding connection, there is a Classic connected device other than a device in which Classic initiating connection or Classic responding connection occurs.

Next, processes in a case in which at the time of occurrence of Classic initiating connection or Classic responding connection between the wireless communication device 100 and a certain remote device, there is another Classic connected device will be described with reference to FIG. 6. FIG. 6 is a flowchart illustrating processes in a case in which at the time of occurrence of Classic initiating connection or Classic slave connection, there is a Classic connected device other than a device in which Classic initiating connection or Classic responding connection occurs. Each process in the flowchart of FIG. 6 is executed by the processor 201.

The processor 201 determines whether there is another connected remote device at the time of occurrence of connection between the wireless communication device 100 and a remote device (S61). The connection between the wireless communication device 100 and the remote device is Classic initiating connection or Classic responding connection.

When it is determined that there is no another connected remote device at the time of occurrence of connection between the wireless communication device 100 and the remote device (NO in S61), the processor 201 ends the process.

When it is determined that there is another connected remote device at the time of occurrence of the connection between the wireless communication device 100 and the remote device (YES in S61), the processor 201 executes a determination process related to whether the central operation or the peripheral operation is performed for each of the connected remote devices (S62). The processes from step S62 to step S69 are repeated by the number of connected remote devices.

The processor 201 determines whether the wireless communication device 100 is the peripheral (S63).

When it is determined that the wireless communication device 100 is not the peripheral (NO in S63), the wireless communication device 100 remains as the central, and the processor 201 transitions to the process of the next connected remote device.

When it is determined that the wireless communication device 100 is the peripheral (YES in S63), the processor 201 determines whether BT hands-free call is ongoing or BT Audio streaming is ongoing (S64). The BT hands-free call indicates, for example, a state in which an HFP eSCO link is established and voice packets are exchanged between the wireless communication device 100 and the remote device. Music being reproduced by BT indicates, for example, being A2DP streaming reproduced.

When it is determined that BT hands-free call is ongoing or BT Audio streaming is ongoing (YES in S64), the processor 201 does not perform role switch of the wireless communication device 100 and performs the peripheral operation (S68). After the process of step S68, the processor 201 transitions to the process of the next connected remote device.

When it is determined that BT hands-free call is not ongoing and BT Audio streaming is not ongoing (NO in S64), the processor 201 requests the remote device for role switch (S65).

The processor 201 determines whether the remote device accepts role switch (S66).

When it is determined that the remote device does not accept role switch (NO in S66), the processor 201 does not perform role switch, performs the peripheral operation (S68), and transitions to the process of the next connected remote device.

When it is determined that the remote device accepts role switch (YES in S66), the processor 201 sets the role of the communication circuit 202 of the wireless communication device 100 with respect to the remote device to the central, performs the central operation (S67), and transitions to the process of the next connected remote device.

When the processes from step S63 to step S69 for all the connected remote devices are ended, the processor 201 ends the process.

The processor 201 executes the processes of the flowchart illustrated in FIG. 6, for example, when connection between the wireless communication device 100 and a new remote device occurs.

Accordingly, when there is another connected remote device at the time of Classic initiating connection or Classic responding connection with the remote device, the wireless communication device 100 can perform role switch in accordance with a connection condition of each connected remote device. In a case in which in the connected remote device neither BT hands-free call is ongoing nor BT Audio streaming is ongoing, the wireless communication device 100 can request the connected remote device for role switch. Accordingly, when the remote device accepts role switch, the wireless communication device 100 can become the central, and thus the performance of communication can be stabilized. In addition, when the connected remote device is in a hands-free call of BT or music is being reproduced by BT, the wireless communication device 100 performs the peripheral operation without requesting role switch for the connected remote device. Accordingly, the wireless communication device 100 can prevent deterioration in performance such as a call of a remote device or a sound skipping of music, and improve the convenience of the user.

Figure 7:
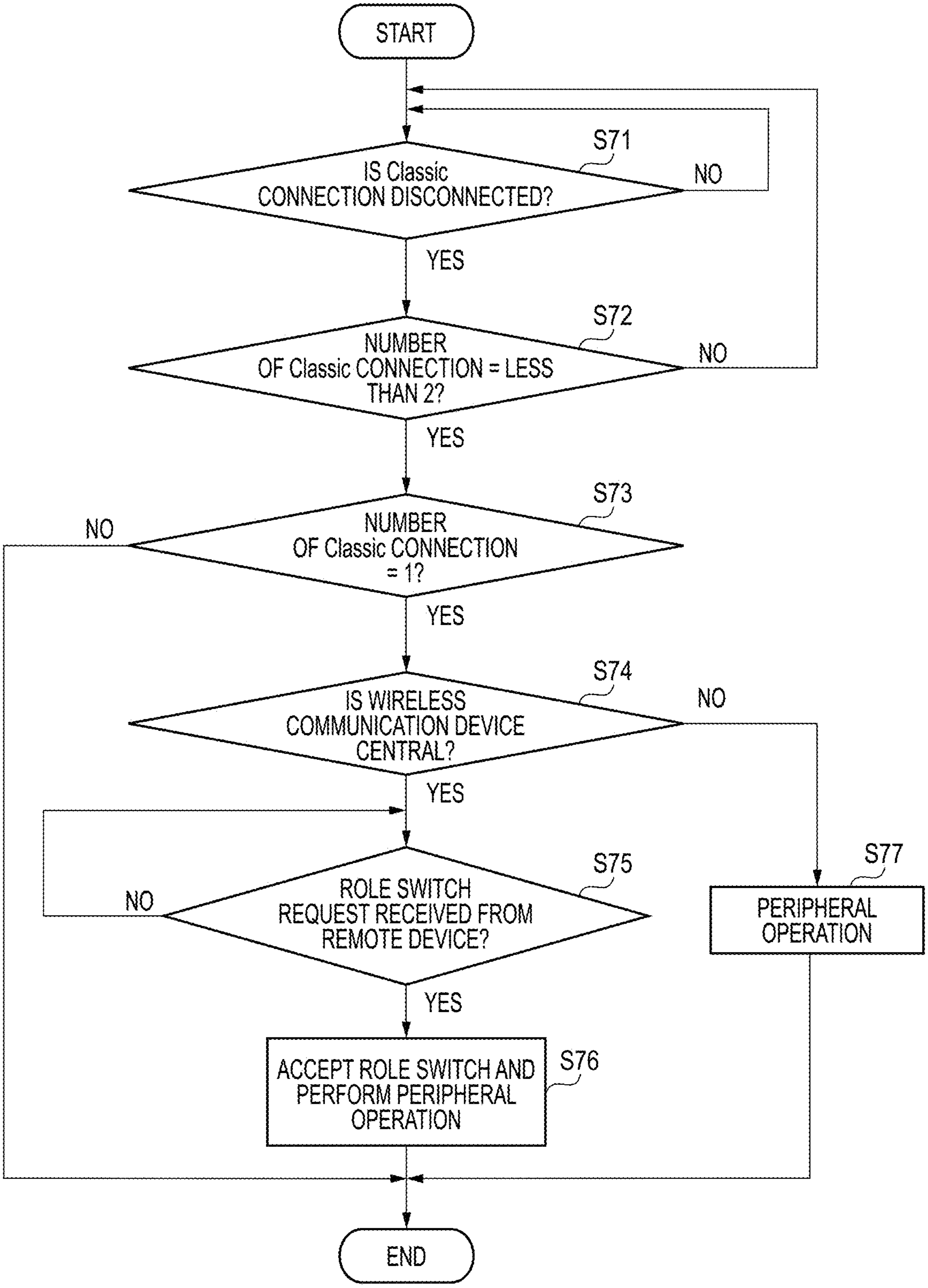
FIG. 7 is a flowchart illustrating processes in a case in which a plurality of remote devices are Classic connected to the wireless communication device and disconnection of Classic connection occurs.

Next, processes in a case in which a plurality of remote devices are Classic connected to the wireless communication device 100 and disconnection of Classic connection occurs will be described with reference to FIG. 7. FIG. 7 is a flowchart illustrating processes in a case in which a plurality of remote devices are Classic connected to the wireless communication device 100 and disconnection of Classic connection occurs.

The processor 201 determines whether Classic connection between the wireless communication device 100 and the remote devices is disconnected (S71).

When it is determined that the Classic connection is not disconnected (NO in S71), the processor 201 executes the process of step S71 again. In this manner, the processor 201 monitors whether the Classic connection is disconnected during the Classic connection.

When it is determined that the Classic connection is disconnected (YES in S71), the processor 201 determines whether the number of Classic connection is less than two (S72).

When it is determined that the number of Classic connection is not less than two (NO in S72), the processor 201 executes the process of step S71 again.

When it is determined that the number of Classic connection is less than two (YES in S72), the processor 201 determines whether the number of Classic connection is one (S73).

When the number of Classic connection is not one, that is, when the number of Classic connection is zero and all Classic connections are disconnected (NO in S73), the processor 201 ends the process.

When it is determined that the number of Classic connection is one (YES in S73), the processor 201 determines whether the wireless communication device 100 is the central with respect to the remote device (S74).

When it is determined that the wireless communication device 100 is not the central with respect to the remote device (NO in S74), the processor 201 performs the peripheral operation without performing role switch (S77), and ends the process.

When it is determined that the wireless communication device 100 is the central with respect to the remote device (YES in S74), the processor 201 determines whether the request for role switch is generated from the remote device, that is, whether the request for role switch is received from the remote device (S75).

When it is determined that the request for role switch is not generated from the remote device (NO in S75), the processor 201 executes the process of step S75 again and monitors the request for role switch from the remote device.

When it is determined that the request for role switch is generated from the remote device (YES in S75), the processor 201 accepts the request for role switch, sets the role of the communication circuit 202 of the wireless communication device 100 with respect to the remote device to the peripheral, and performs the peripheral operation (S76).

As described above, when the number of remote devices connected by the same standard is less than L (L is an integer equal to or more than 1)+1, the wireless communication device 100 according to the first embodiment accepts the acquisition request for the central from the remote device and becomes the peripheral with respect to the remote device. When the number of remote devices connected by the same standard is equal to or more than L+1, the wireless communication device 100 rejects the acquisition request for the central from the remote device and becomes the central with respect to the remote device. Here, connection of the same standard indicates Classic connection. In the first embodiment, L=1.

Accordingly, in a case in which after the number of connection of remote devices is increased, the disconnection occurs, the number of connection is decreased, and finally one-to-one connection is established, the wireless communication device 100 can allow the operation as the peripheral. Accordingly, the wireless communication device 100 can accept that the remote device becomes the central and improve the convenience of the user having the remote device. Accordingly, it is possible to suppress deterioration in performance on a remote device side.

Accordingly, the wireless communication device 100 according to the first embodiment can cope with the case of Classic initiating connection and the case of Classic responding connection. The wireless communication device 100 can avoid a situation in which the request for role switch for acquisition of the central from both the wireless communication device 100 and the remote device is repeated. In addition, the wireless communication device 100 accepts the peripheral operation in a case of one-to-one connection with the remote device by Classic connection, and thus can suppress deterioration in performance of the own device at the time of Classic connection with a plurality of remote devices while accepting the central operation on the remote device side in a situation where there is no concern about deterioration in performance. The above is an exemplary embodiment of the present disclosure, but the present disclosure is not limited to the scope of the embodiment illustrated in the description and the drawings, and can be carried out with modifications without departing from the gist thereof. For example, it is possible to select whether to execute or not to execute the processes illustrated in the flowchart of FIG. 6. At the time of activation of the wireless communication device 100, the wireless communication device 100 may be set so that it is possible to select whether to execute or not to execute each process.

Second Embodiment

Next, the wireless communication system 1 according to a second embodiment will be described with reference to the drawings. A configuration example of the wireless communication system 1 is the same as that of FIG. 1 described in the first embodiment, and the description thereof will be omitted. A hardware configuration of a wireless communication device 100A (see FIG. 8) according to the second embodiment is the same as that of the first embodiment, but an internal configuration of the communication circuit 202 is different.

The communication circuit 202 according to the second embodiment is executed by a controller that transmits and receives wireless signals based on Classic and BLE (combo module integrated with Classic/BLE or combo module integrated with Classic/BLE/Wi-Fi (registered trademark)). The communication circuit 202 supports, by one controller, a dual mode in which both Classic and BLE are simultaneously operated.

Figure 8:
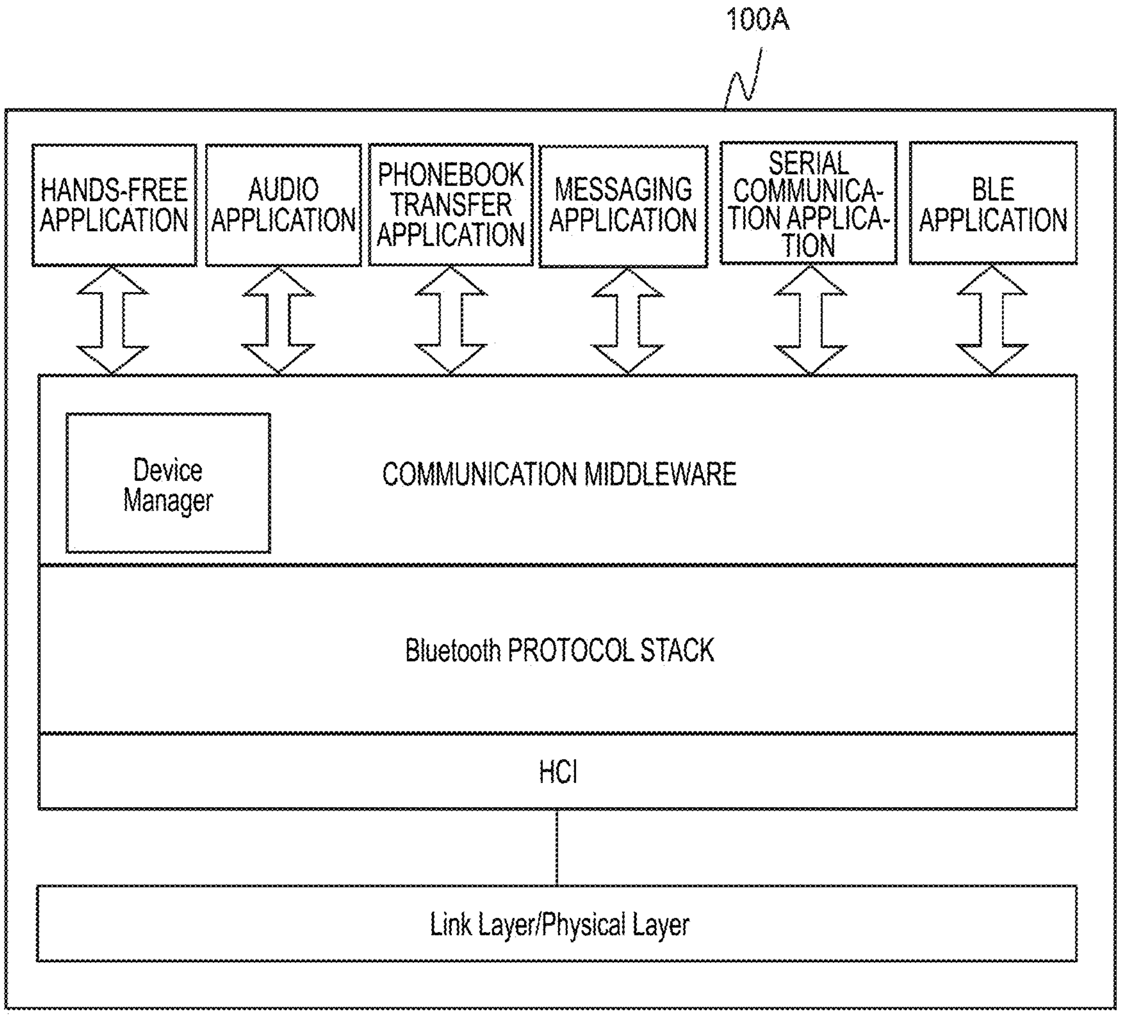
FIG. 8 is a diagram illustrating a hierarchical structure of a software program of a wireless communication device 100A according to a second embodiment.

Next, a software configuration of the wireless communication device 100A will be described with reference to FIG. 8. FIG. 8 is a diagram illustrating a hierarchical structure of a software program of the wireless communication device 100A according to the second embodiment.

The wireless communication device 100A includes various applications (hands-free application, audio application, phonebook transfer application, messaging application, serial communication application, BLE communication application, and the like) and software including communication middleware, a Bluetooth protocol stack, and an HCI.

The configuration other than the BLE application in FIG. 8 is the same as the configuration in FIG. 3 of the first embodiment, and thus the description thereof is omitted.

The BLE application is any application that uses BLE and performs Generic Attribute Profile communication between the wireless communication device 100A and the remote device. The remote device is, for example, a smart phone or a remote controller. Descriptions will be made on the assumption of connection with the wireless communication device 100A as the peripheral and the remote device as the central, but the present invention is not limited thereto. The BLE application is configured to be simultaneously connected with a plurality of remote devices by one application. When there are a plurality of BLE applications, a configuration capable of being simultaneously connected with a plurality of remote devices can be adopted.

A processing operation of the wireless communication device 100A configured as described above will be described below. First, a processing operation of performing role switch control of the wireless communication device 100A will be described with reference to FIGS. 9 to 13.

Figure 9:
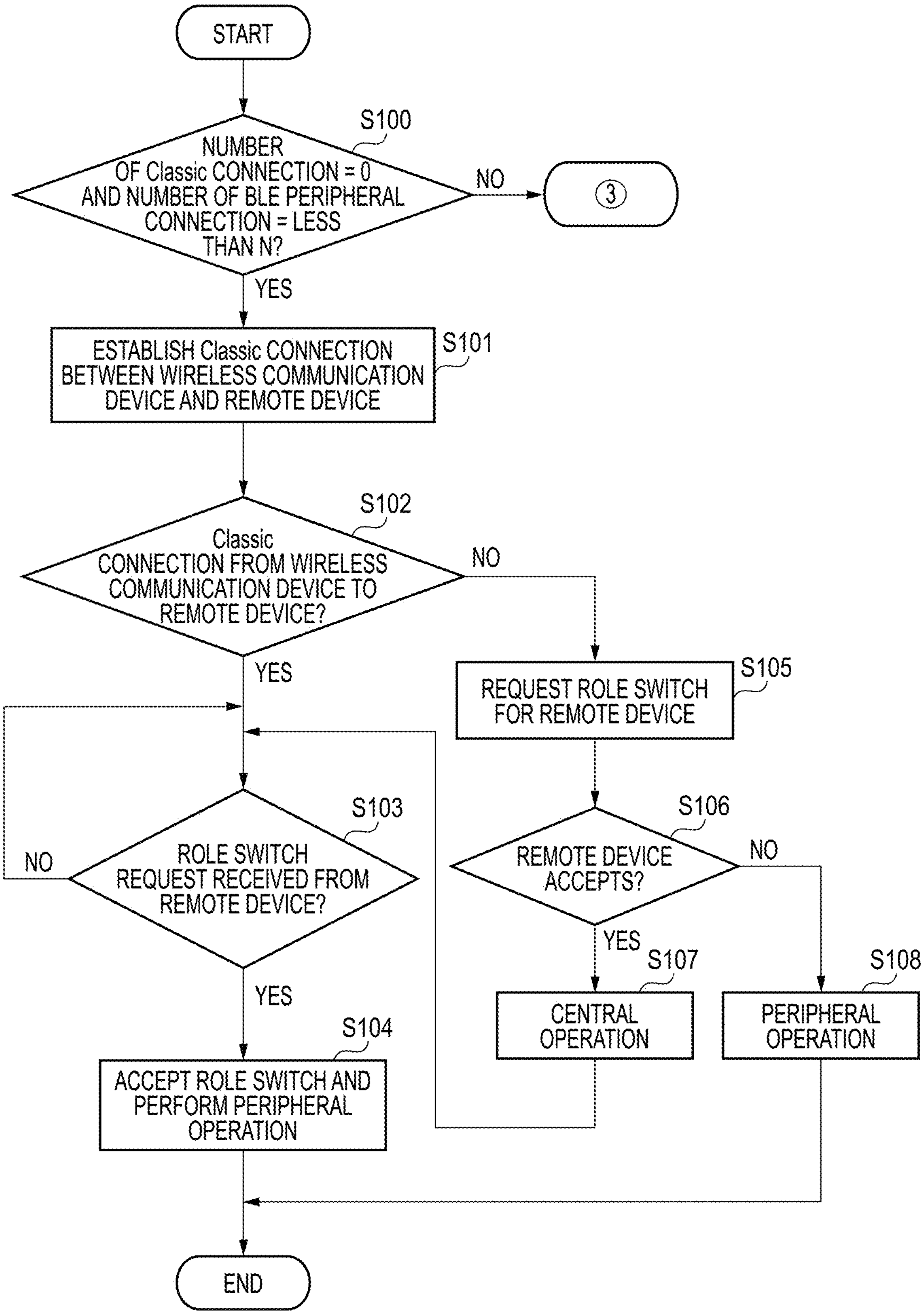
FIG. 9 is a flowchart illustrating processes when the number of Classic connection is zero and the number of BLE peripheral connection is less than N.

Processes when the number of Classic connection is zero and the number of BLE peripheral connection is less than N will be described with reference to FIG. 9. FIG. 9 is a flowchart illustrating the processes when the number of Classic connection is zero and the number of BLE peripheral connection is less than N.

The processor 201 determines whether the number of Classic connection is zero and the number of BLE peripheral connection is less than N (S100). The BLE peripheral connection indicates a state of connection by BLE with the wireless communication device 100A as the peripheral and the remote device as the central. The number of BLE peripheral connection indicates the number of remote devices to which the wireless communication device 100A is connected by BLE. Here, N is an integer of 1 or more, for example, 3. The number of N varies depending on the performance of the communication circuit 202 and is not limited to three.

Figure 10:
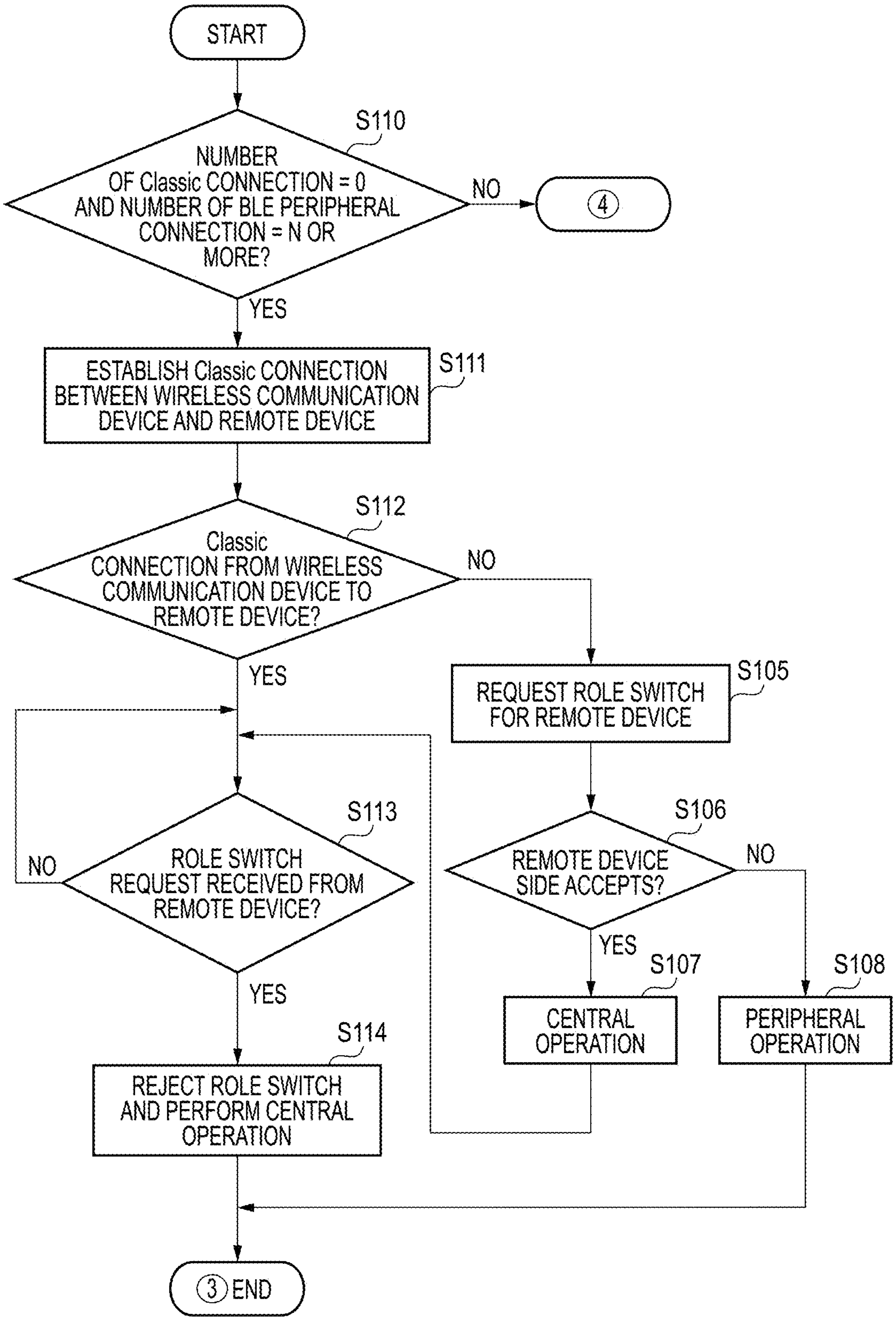
FIG. 10 is a flowchart illustrating processes when the number of Classic connection is zero and the number of BLE peripheral connection is N or more.

When it is determined that the number of Classic connection is 0 and the number of BLE peripheral connection is not less than N (NO in S100), the processor 201 transitions to the processes of the flowchart in FIG. 10.

When it is determined that the number of Classic connection is zero and the number of BLE peripheral connection is less than N (YES in S100), the processor 201 establishes Classic connection between the wireless communication device 100A and the remote device (S101).

In the process of step S101, the processor 201 determines whether to be Classic connection from the wireless communication device 100A to the remote device (S102).

When it is determined to be Classic connection from the wireless communication device 100A to the remote device (YES in S102), the processor 201 determines whether a request for role switch of central is generated from the remote device (S103). The processor 201 determines whether the request for role switch of the central from the remote device occurs based on whether a signal (LMP_switch_req) indicating a request for role switch is received from the remote device.

When it is determined that the request for role switch of the central is not generated from the remote device (NO in S103), the processor 201 executes the process of step S103 again.

When it is determined that the request for role switch of the central is generated from the remote device (YES in S103), the processor 201 accepts the request for role switch, sets the role of the communication circuit 202 of the wireless communication device 100A to the peripheral, and performs the peripheral operation (S104). When there is no change in the number of connections between the wireless communication device 100A and the remote device after the wireless communication device 100A once transitions to the peripheral with respect to the remote device, a role switch request in which the wireless communication device 100A is the central is not issued. That is, after accepting the request for role switch from the remote device, the processor 201 controls the communication circuit 202 so that the communication circuit 202 does not send an acquisition request for the central to the remote device.

When it is determined not to be Classic connection from the wireless communication device 100A to the remote device, that is, to be Classic connection from the remote device to the wireless communication device 100A (NO in S102), the processor 201 requests the remote device for role switch in which the wireless communication device 100A becomes the central (S105). The number of times that the wireless communication device 100A requests the remote device for role switch is not limited to once, and may be set to a predetermined number of times (for example, twice or three times) by a designer or the like of the wireless communication system 1. The predetermined number of times is preferably once or less.

The processor 201 determines whether the remote device accepts role switch (S106). The processor 201 determines whether the remote device accepts role switch based on whether a signal (LMP_accepted) indicating that role switch is accepted is received from the remote device.

When it is determined that the remote device accepts role switch (YES in S106), the processor 201 sets the role of the communication circuit 202 of the wireless communication device 100A with respect to the remote device to the central and performs the central operation (S107). Even in a case in which the wireless communication device 100A becomes the central, when the wireless communication device 100A and the remote device maintain one-to-one Classic connection and the number of BLE peripheral connection is less than N, the wireless communication device 100A accepts a request for role switch taking the central from the remote device if the request exists. Therefore, the processor 201 executes the process of step S103 after the process of step S107.

When it is determined that the remote device does not accept role switch (NO in S106), the processor 201 performs the peripheral operation while maintaining the role of the communication circuit 202 of the wireless communication device 100 with respect to the remote device as the peripheral (S108).

Accordingly, in a case of connection with a predetermined number or less of remote devices by BLE, the wireless communication device 100A according to the second embodiment can perform the peripheral operation in response to a request for role switch from the remote device at the time of Classic initiating connection. Accordingly, when the number of remote devices connected by BLE is small and the performance communication is not affected, the wireless communication device 100A can operate with the Classic master connected remote device as the central. Accordingly, the convenience of the user can be improved. In addition, accordingly, it is possible to suppress deterioration in performance on the Classic master connected remote device side.

Next, processes when the number of Classic connection is zero and the number of BLE peripheral connection is N or more will be described with reference to FIG. 10. FIG. 10 is a flowchart illustrating the processes when the number of Classic connection is zero and the number of BLE peripheral connection is N or more. In FIG. 10, the same reference numerals as those in FIG. 9 are given to the same processes as those in FIG. 9, and the description thereof will be omitted.

The processor 201 determines whether the number of Classic connection is zero and the number of BLE peripheral connection is N or more (S110).

Figure 11:
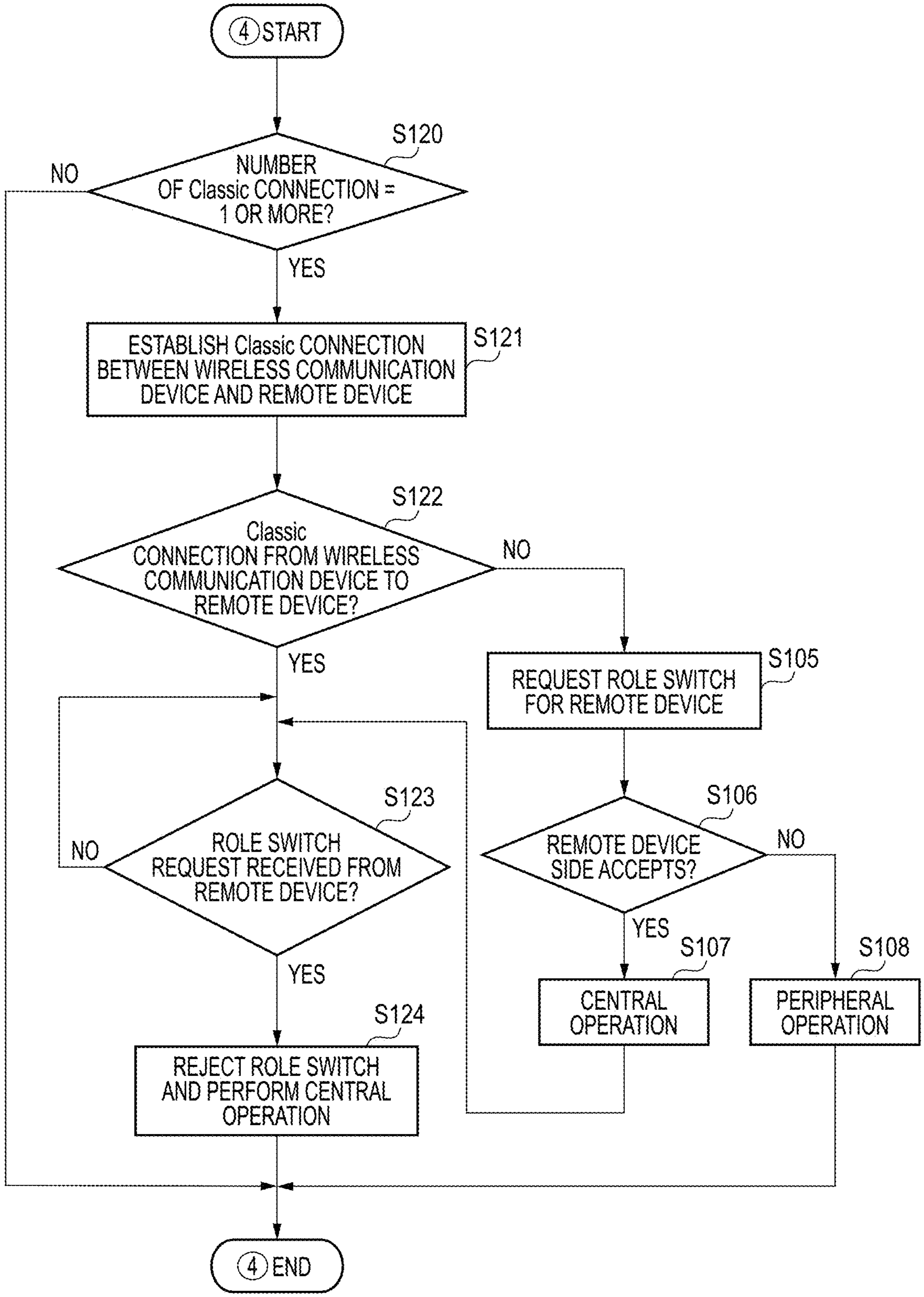
FIG. 11 is a flowchart illustrating processes when the number of Classic connection is one or more and the number of BLE peripheral connection is any number.

When it is determined that the number of Classic connection is zero and the number of BLE peripheral connection is not N or more (NO in S110), the processor 201 transitions to the processes of the flowchart in FIG. 11.

When it is determined that the number of Classic connection is zero and the number of BLE peripheral connection is N or more (YES in S110), the processor 201 establishes Classic connection between the wireless communication device 100A and the remote device (S111).

In the process of step S111, the processor 201 determines whether to be Classic connection from the wireless communication device 100A to the remote device (S112).

When it is determined not to be Classic connection from the wireless communication device 100A to the remote device (NO in S112), the processor 201 executes the process of step S105 and subsequent steps. The processes of steps S105, S106, S107, and S108 are the same as those of the flowchart in FIG. 9.

When it is determined to be Classic connection from the wireless communication device 100A to the remote device (YES in S112), the processor 201 determines whether a request for role switch is generated from the remote device (S113). The processor 201 determines whether a request for role switch is generated by determining whether a request signal of role switch (LMP_switch_req) is received from the remote device.

When it is determined that the request for role switch is not generated from the remote device (NO in S113), the processor 201 executes the process of S113 again.

When it is determined that the request for role switch is generated from the remote device (YES in S113), the processor 201 rejects role switch and performs the central operation (S114).

Accordingly, the wireless communication device 100A according to the second embodiment can reject a request for role switch from a newly Classic master connected remote device when the number of BLE peripheral connected remote devices is equal to or more than the predetermined number even when the number of Classic connection is zero. Accordingly, when there are many BLE peripheral connected remote devices, the wireless communication device 100A becomes the central with respect to the Classic master connected remote device. Therefore, the wireless communication device 100A can prevent the performance of communication from being deteriorated.

Next, processes when the number of Classic connection is one or more and the number of BLE peripheral connection is any number will be described with reference to FIG. 11. FIG. 11 is a flowchart illustrating the processes when the number of Classic connection is one or more and the number of BLE peripheral connection is any number. Processes similar to those in the flowchart of FIG. 9 are denoted by the same reference numerals, and the description thereof will be omitted.

The processor 201 determines whether the number of Classic connection is one or more (S120).

When it is determined that the number of Classic connection is not one or more (NO in S120), the processor 201 ends the process.

When it is determined that the number of Classic connection is one or more (YES in S120), the processor 201 establishes Classic connection between the wireless communication device 100A and the remote device (S121).

In the process of step S121, the processor 201 determines whether to be Classic connection from the wireless communication device 100A to the remote device (S122).

When it is determined not to be Classic connection from the wireless communication device 100A to the remote device, that is, to be Classic connection from the remote device to the wireless communication device 100A (NO in S122), the processor 201 executes the process of step S105. The processes of steps S105, S106, S107, and S108 are the same as those of the flowchart in FIG. 9.

When it is determined to be Classic connection from the wireless communication device 100A to the remote device (YES in S122), the processor 201 determines whether a request for role switch is generated from the remote device (S123).

When it is determined that the request for role switch is not generated from the remote device (NO in S123), the processor 201 executes the process of step S123 again.

When it is determined that the request for role switch is generated from the remote device (YES in S123), the processor 201 rejects role switch and performs the central operation (S124).

An operation when at the time of occurrence of Classic initiating connection or Classic responding connection, there is a Classic connected device other than a device in which Classic initiating connection or Classic responding connection is the same as in FIG. 6, and the description thereof is omitted here.

A case in which the wireless communication device 100A receives the request for role switch from the remote device after the number of BLE peripheral connection is changed while the number of Classic connection remains one will be described hereinafter (not illustrated). Hereinafter, the number of Classic connection is one, and the role of the communication circuit 202 of the wireless communication device 100A with respect to the remote device is central.

When the request for role switch is received from the remote device after the number of BLE peripheral connection changes, the processor 201 determines whether the number of BLE peripheral connection is less than N.

When it is determined that the number of BLE peripheral connection is less than N, the processor 201 accepts the request for role switch from the remote device and sets the role of the communication circuit 202 of the wireless communication device 100A with respect to the remote device to the peripheral. That is, the communication circuit 202 performs the peripheral operation.

When it is determined that the number of BLE peripheral connection is not less than N, that is, the number of BLE peripheral connection is N or more, the processor 201 rejects the request for role switch from the remote device and keeps the role of the communication circuit 202 of the wireless communication device 100A with respect to the remote device as the central. That is, the communication circuit 202 performs the central operation.

The number of Classic connection is not limited to one, and may be a number (for example, two or less) set by the user depending on the performance of the communication circuit 202.

As described above, when the number of Classic connection does not change from the predetermined number and the number of BLE peripheral connection increases or decreases, the processor 201 can accept or reject the request for role switch of the remote device according to the number of BLE peripheral connection. Accordingly, when the number of BLE peripheral connection increases to be equal to or more than a threshold and there is a possibility that the performance of communication deteriorates, the processor 201 becomes the central with respect to the remote device and can stabilize the performance of communication. When the number of BLE peripheral connection is less than the threshold, the processor 201 can accept that the remote device becomes the central and improve the convenience of the user who uses the remote device. Accordingly, it is possible to suppress deterioration in performance on a remote device side.

Figure 12:
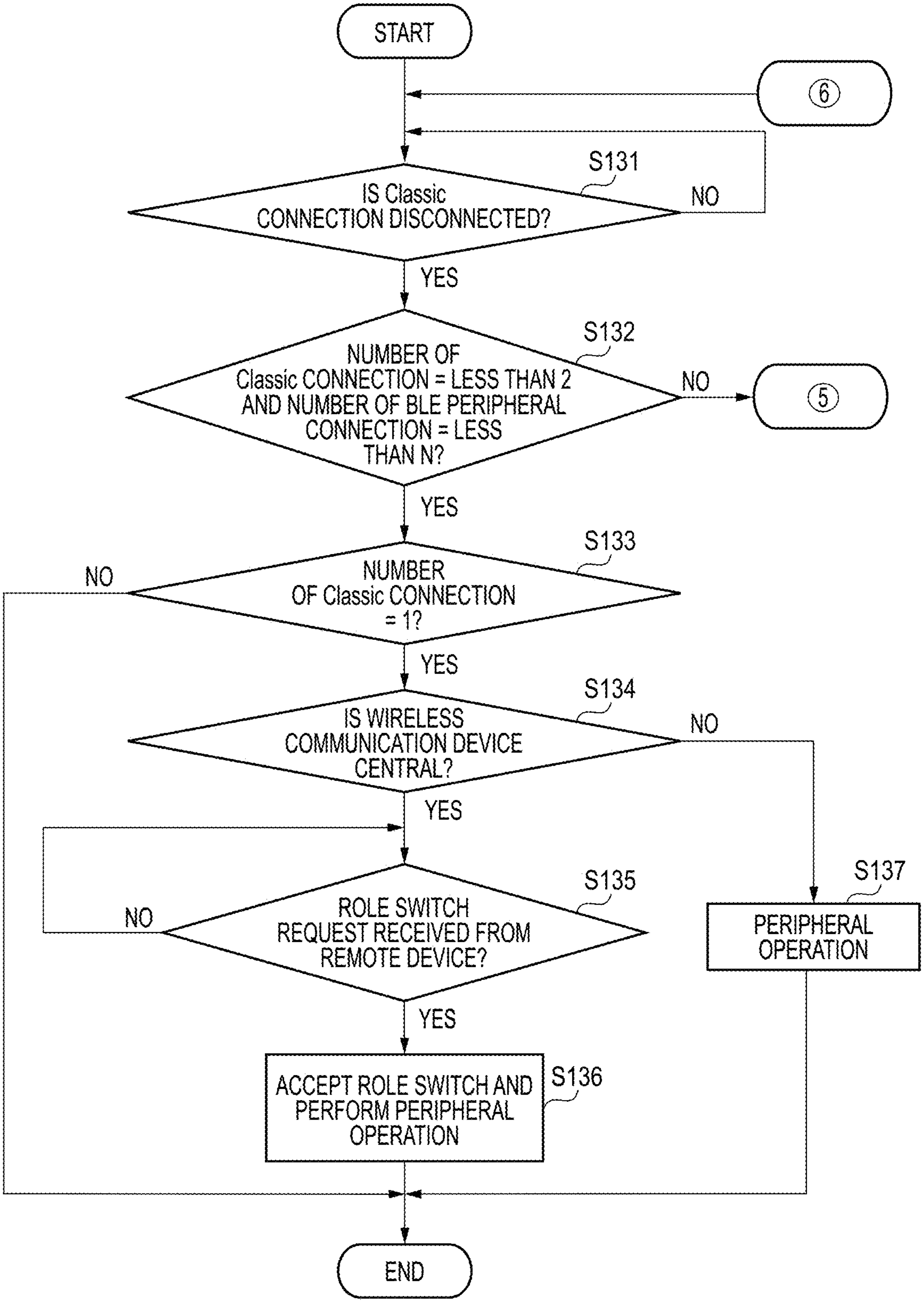
FIG. 12 is a flowchart of a first process when Classic disconnection occurs in a case in which there is a Classic connected remote device.

Next, a first process at the time of occurrence of Classic disconnection in a case in which there is a Classic connected remote device will be described with reference to FIG. 12. FIG. 12 is a flowchart of the first process at the time of occurrence of Classic disconnection in a case in which there is a Classic connected remote device.

The processor 201 determines whether Classic connection with the remote device to which the wireless communication device 100A is Classic connected is disconnected (S131).

When it is determined that Classic connection with the Classic connected remote device is not disconnected (NO in S131), the processor 201 executes the process of S131 again and continues to monitor whether Class disconnection occurs.

When it is determined that Classic connection with the Classic connected remote device is disconnected (YES in S131), the processor 201 determines whether the number of Classic connection is less than two and the number of BLE peripheral connection is less than N (S132).

Figure 13:
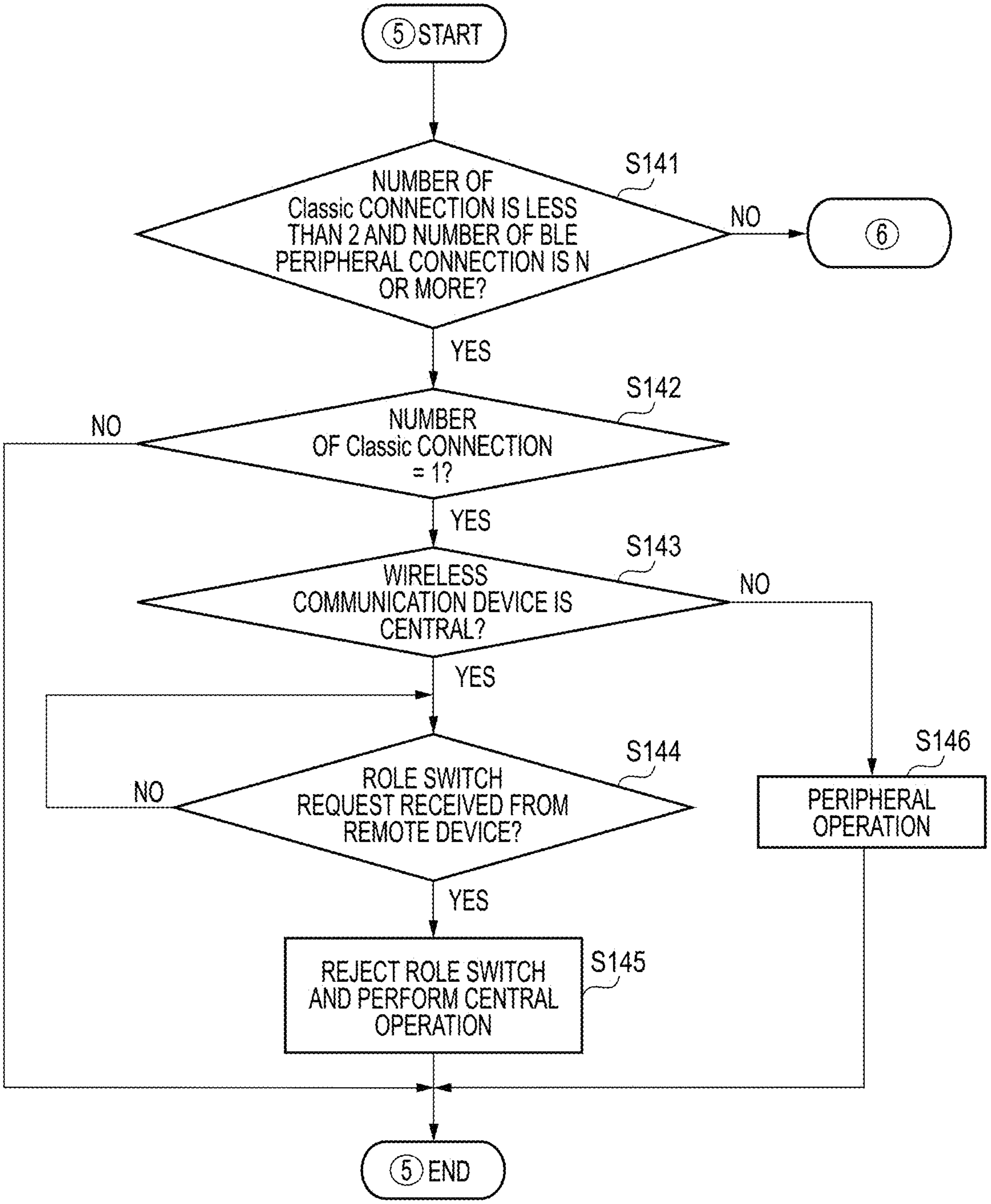
FIG. 13 is a flowchart of a second process when Classic disconnection occurs in a case in which there is a Classic connected remote device.

When it is determined that the number of Classic connection is less than two and the number of BLE peripheral connection is not less than N (NO in S132), the processor 201 transitions to processes of the flowchart illustrated in FIG. 13.

When it is determined that the number of Classic connection is less than two and the number of BLE peripheral connection is less than N (YES in S132), the processor 201 determines whether the number of Classic connection is one (S133).

When it is determined that the number of Classic connection is not one, that is, all Classic connections are disconnected (NO in S133), the processor 201 ends the process.

When it is determined that the number of Classic connection is one (YES in S133), the processor 201 determines whether the wireless communication device 100A is the central with respect to the remote device (S134).

When it is determined that the wireless communication device 100A is not the central with respect to the remote device (NO in S134), the processor 201 does not perform role switch, performs the peripheral operation (S137), and ends the process.

When it is determined that the wireless communication device 100A is the central with respect to the remote device (YES in S134), the processor 201 determines whether the request for role switch is generated from the remote device (S135). The processor 201 determines whether the request for role switch occurs by determining whether a signal (LMP_switch_req) requesting role switch is received from the remote device.

When it is determined that the request for role switch is not generated from the remote device (NO in S135), the processor 201 executes the process of step S135 again and monitors the request for role switch from the remote device. The processor 201 continues to monitor while there is no change in the number of connection with remote devices.

When it is determined that the request for role switch is generated from the remote device (YES in S135), the processor 201 accepts role switch, sets the role of the communication circuit 202 with respect to the remote device to the peripheral, and performs the peripheral operation (S136).

Accordingly, the wireless communication device 100A can accept the operation of the wireless communication device 100A as the peripheral when the number of BLE peripheral connection is less than N at a time point when after the number of Classic connection increases, disconnection occurs, the number of Classic connection decreases, and one-to-one connection is executed.

Next, a second process at the time of occurrence of Classic disconnection in a case in which there is a Classic connected remote device will be described with reference to FIG. 13. FIG. 13 is a flowchart of the second process at the time of occurrence of Classic disconnection in a case in which there is a Classic connected remote device.

The processor 201 determines whether the number of Classic connection is less than two and the number of BLE peripheral connection is N or more (S141).

When it is determined that the number of Classic connection is less than two and the number of BLE peripheral connection is not N or more, that is, the number of Classic connection is two or more (NO in S141), the processor 201 executes the processes of the flowchart in FIG. 12 again and continues to monitor whether Classic disconnection occurs.

When it is determined that the number of Classic connection is less than two and the number of BLE peripheral connection is N or more (YES in S141), the processor 201 determines whether the number of Classic connection is one (S142).

When it is determined that the number of Classic connection is not one (NO in S142), the processor 201 determines that all Classic connections are disconnected, and ends the process.

When it is determined that the number of Classic connection is one (YES in S142), the processor 201 determines whether the wireless communication device 100A is the central with respect to the Classic connected remote device (S143).

When it is determined that the wireless communication device 100A is not the central (NO in S143), the processor 201 does not perform role switch, becomes the peripheral (S146), and ends the process.

When it is determined that the wireless communication device 100A is the central (YES in S143), the processor 201 determines whether the request for role switch is generated from the remote device (S144). The processor 201 determines whether the request for role switch occurs by determining whether a signal (LMP_switch_req) requesting role switch is received from the remote device.

When it is determined that the request for role switch is not generated from the remote device (NO in S144), the processor 201 executes the process of step S144 again, and continues to monitor presence or absence of the request for role switch from the remote device while the number of connections with the remote device is not changed.

When it is determined that the request for role switch is generated from the remote device (YES in S144), the processor 201 rejects role switch and performs the central operation.

When the wireless communication device 100A is the central with respect to the remote device (YES in S143), the processor 201 proceeds to step S144. In step S144, the processor 201 determines whether there is a role switch request from the remote device side in which the remote device side is the central.

When there is no role switch request (NO in S144), the processor 201 returns the process to before S144 and monitors presence or absence of a role switch request from the remote device side. While there is no change in the number of connections, the processor 201 continues to monitor.

When there is a role switch request from the remote device side (YES in S144), the processor 201 rejects the request, and the wireless communication device 100A performs the central operation (S145).

As described above, the wireless communication device 100A according to the second embodiment can determine the role with respect to the remote device in accordance with the number of Classic connection and the number of BLE peripheral connection in each of a case at the time of Classic initiating connection and a case at the time of Classic responding connection, and can prevent the performance of communication from being deteriorated. The wireless communication device 100A can avoid repeating the request for role switch of the central with the remote device. Even in a case of a dual mode in which Classic connection and BLE peripheral connection simultaneously operate, the wireless communication device 100A accepts the peripheral operation of the own device in a case of Classic connection and one-to-one connection as well as the number of BLE peripheral connection of less than N. Accordingly, the wireless communication device 100A can suppress deterioration in performance of the own device and stabilize communication of the remote device.

When the number of remote devices connected by the same standard is less than L (L is an integer equal to or more than 1)+1, the wireless communication device 100A according to the second embodiment accepts the acquisition request for the central from the remote device and is the peripheral with respect to the remote device. When the number of remote devices connected by the same standard is equal to or more than L+1, the wireless communication device 100 rejects the acquisition request for the central from the remote device and becomes the central with respect to the remote device. Here, the connection of the same standard indicates BLE peripheral connection. In the second embodiment, N corresponds to L+1.

The above are exemplary embodiments of the present invention, but the present invention is not limited to the scope of the embodiments illustrated in the description and the drawings, and can be carried out with modifications without departing from the gist thereof.

In the above-described first embodiment and second embodiment, an in-vehicle device is described as an example of a wireless communication device, but the present invention is not limited thereto, and can be applied to various devices such as an in-aircraft entertainment system device, a television set, a Blu-ray/DVD recorder, a refrigerator, a washing machine, a vacuum cleaner, a microwave oven, a lighting device, an air conditioner, an air cleaner, a camera, a printer, a projector, a scanner, a fitness device, a vending machine, and a game machine.

The present disclosure has been described assuming that a program for executing functions of the above-described first embodiment and second embodiment is provided in the in-vehicle device, but the present invention is not limited thereto, and can also be executed by a process in which the program is supplied to a device via an external network, Over The Air (OTA), or a storage medium, and a processor in a computer of the device reads and executes the program.

SUMMARY OF PRESENT EMBODIMENT

The following techniques are disclosed according to the above description of the present embodiment.

<Technique 1>

A wireless communication device according to the present embodiment includes a communication circuit configured to perform communication in a mode of central or peripheral with respect to a plurality of remote devices, a memory storing instructions, and a processor. The processor executes the instructions to accept an acquisition request for the central from the remote devices and set a role of the communication circuit with respect to the remote devices to the peripheral, when the number of remote devices connected to the communication circuit by communication of the same standard is less than L (L: integer of 1 or more)+1. Further, when the number of remote devices connected to the communication circuit by communication of the same standard is L+1 or more, the processor executes the instructions to reject the acquisition request for the central from the remote devices and set the role of the communication circuit with respect to the remote devices to the central.

Accordingly, the wireless communication device according to the present embodiment can determine whether to accept or reject an acquisition request for central with respect to a remote device in accordance with the number of remote devices connected by communication of the same standard. When it is considered that the number of connected remote devices is small and the performance of communication is not deteriorated, the wireless communication device can become the peripheral with respect to the remote devices. Accordingly, the wireless communication device can accept the acquisition request for the central from the remote device within a range in which the performance of communication of the own device does not deteriorate, and can improve the convenience of the user. In a case in which the number of connected remote devices is large and there is a concern about the deterioration in the performance of communication, the wireless communication device can become the central with respect to the remote devices. As described above, the wireless communication device can stabilize the communication of the remote device and prevent the performance of communication from being deteriorated.

<Technique 2>

In the wireless communication device according to Technique 1, after the communication circuit is connected to any of the remote devices from a state in which the communication circuit is not connected to the remote device, the processor executes the instructions to accept an acquisition request for the central from the remote device, and then to control the communication circuit such that the communication circuit does not send the acquisition request for the central to the remote device.

Accordingly, the wireless communication device according to the present embodiment can prevent an acquisition request for the central from being repeated with the remote device. The wireless communication device can prevent music being reproduced by the remote device by BT communication or a hands-free call by BT communication from being interrupted by repeating the acquisition request for the central. Accordingly, the wireless communication device can support a user to comfortably use the remote device connected with the wireless communication device.

<Technique 3>

In the wireless communication device described in Technique 1 or Technique 2, the processor sends, after connection from any of the remote devices from a state of not being connected to the remote device, an acquisition request for the central to the remote device a predetermined number of times, sets the role of the communication circuit with respect to the remote device to the central when the remote device accepts the acquisition request, and sets the role of the communication circuit with respect to the remote device to the peripheral when the remote device does not accept the acquisition request.

Accordingly, even in a case of connection from a remote device, the wireless communication device according to the present embodiment can become the central when the remote device accepts an acquisition request for the central sent to the remote device. Accordingly, the wireless communication device can become the central in accordance with a usage state of the remote device while maintaining the stability of the communication of the remote device.

<Technique 4>

In the wireless communication device according to any of Techniques 1 to 3, when the remote device accepts the acquisition request for the central, the role of the communication circuit with respect to the remote device is set to the central, and then the acquisition request for the central is received from the remote device, the processor accepts the acquisition request for the central from the remote device.

Accordingly, the wireless communication device according to the present embodiment can become the peripheral in response to an acquisition request for central from a remote device even when the wireless communication device is connected from the remote device and becomes the central once. Accordingly, since the wireless communication device can accept the remote device to become the central in accordance with the usage state of the remote device, it is possible to support the user to comfortably use the remote device.

<Technique 5>

In the wireless communication device according to any of Techniques 1 to 4, after the communication circuit is connected with another new remote device from a state in which one or more remote devices and the communication circuit are connected, the processor rejects the acquisition request for the central from the other remote device.

Accordingly, in a case of connection with two or more remote devices, the wireless communication device according to the present embodiment can reject the acquisition request for the central of the remote device and prevent the remote device from becoming the peripheral. Accordingly, when the number of remote devices to be connected is large, the wireless communication device can prevent the performance of communication from being deteriorated due to becoming the central with respect to the remote device.

<Technique 6>

In the wireless communication device according to any of Techniques 1 to 5, the processor, after the communication circuit is connected from another new remote device from a state in which one or more remote devices and the communication circuit are connected, sends the acquisition request for the central to the other remote device a predetermined number of times, when the other remote device accepts the acquisition request for the central, sets the role of the communication circuit with respect to the remote device to the central, and when the other remote device does not accept the acquisition request for the central, sets the role of the communication circuit with respect to the remote device to the peripheral.

Accordingly, even in a case of connection with one or more remote devices, the wireless communication device according to the present embodiment can become the peripheral with respect to the remote devices when being connected from the remote devices. The wireless communication device can send an acquisition request for the central with respect to the connected remote devices. As described above, the wireless communication device can stabilize the communication of the remote device while controlling the role with respect to the remote device so that the performance of communication does not deteriorate.

<Technique 7>

In the wireless communication device according to any of Techniques 1 to 6, when the other remote device accepts the acquisition request for the central, the role of the communication circuit with respect to the other remote device is set to the central, and then the acquisition request for the central is received from the other remote device, the processor rejects the acquisition request for the central from the other remote device.

Accordingly, when the number of connected remote devices is large, the wireless communication device according to the present embodiment can be avoided from becoming the peripheral with respect to the remote devices once being the central even in a case of connection from the remote devices. Accordingly, the wireless communication device can prevent the performance of communication from being deteriorated.

<Technique 8>

In the wireless communication device according to any of Techniques 1 to 7, the communication circuit performs communication in accordance with a Bluetooth (registered trademark) standard.

As a result, the wireless communication device according to the present embodiment can prevent the performance of communication from being deteriorated at the time of performing Bluetooth standard communication with the remote device.

<Technique 9>

In the wireless communication device according to any of Techniques 1 to 8, the communication circuit performs communication in compliance with a first standard and a second standard in a mode of the central or the peripheral with respect to the plurality of remote devices.

Accordingly, the wireless communication device according to the present embodiment can perform switching control between the central and the peripheral so that the performance of communication does not deteriorate even in communication in the dual mode.

<Technique 10>

In the wireless communication device according to any of Techniques 1 to 9, the processor, when one of the remote devices and the communication circuit are connected by communication in compliance with the first standard and less than L+1 remote devices and the communication circuit are connected by communication in compliance with the second standard by setting the role of the communication circuit to the peripheral, accepts the acquisition request for the central from the remote device connected with the communication circuit by communication in compliance with the first standard and sets the role of the communication circuit with respect to the remote device to the peripheral, when one of the remote devices and the communication circuit are connected by communication in compliance with the first standard and L+1 or more remote devices and the communication circuit are connected by communication in compliance with the second standard by setting the role of the communication circuit to the peripheral, rejects the acquisition request for the central from the remote device connected with the communication circuit by communication in compliance with the first standard and sets the role of the communication circuit with respect to the remote device to the central, and when two or more of the remote devices and the communication circuit are connected by communication in compliance with the first standard, rejects the acquisition request for the central from the remote devices connected by communication in compliance with the first standard and sets the role of the communication circuit with respect to the remote devices to the central.

Accordingly, the wireless communication device according to the present embodiment is connected with one remote device by communication in compliance with the first standard, and in a case of connection with the remote device by communication in compliance with the first standard, the wireless communication device can become the central with respect to the remote device regardless of the number of remote devices connected by communication in compliance with the second standard. That is, in a case of communication with the remote device in the dual mode, when the number of remote devices to be connected by communication in compliance with the first standard is large, the wireless communication device can become the central with respect to the connected remote devices, thereby preventing deterioration in the performance of communication.

<Technique 11>

In the wireless communication device according to any of Techniques 1 to 10, the processor, when none of the remote devices is connected with the communication circuit by communication in compliance with the first standard and less than L+1 remote devices and the communication circuit are connected by communication in compliance with the second standard by setting the role of the communication circuit to the peripheral, accepts, after the communication circuit is connected to the remote device by communication in compliance with the first standard, an acquisition request for the central from the remote device connected with the communication circuit by communication in compliance with the first standard, and then controls the communication circuit so that the communication circuit does not send the acquisition request for the central to the remote device connected with the communication circuit by communication in compliance with the first standard, when none of the remote devices is connected with the communication circuit by communication in compliance with the first standard and less than L+1 remote devices and the communication circuit are connected by communication in compliance with the second standard by setting the role of the communication circuit to the peripheral, sends, after connection from the remote device to the communication circuit by communication in compliance with the first standard, the acquisition request for the central a predetermined number of times to the remote device connected to the communication circuit by communication in compliance with the first standard, and when the remote device connected with the communication circuit by communication in compliance with the first standard accepts the acquisition request for the central, sets the role of the communication circuit with respect to the remote device to the central, and accepts, after the role of the communication circuit is set to the central, the acquisition request for the central from the remote device connected to the communication circuit by communication in compliance with the first standard, and when none of the remote devices is connected by communication in compliance with the first standard and less than L+1 remote devices and the communication circuit are connected by communication in compliance with the second standard by setting the role of the communication circuit to the peripheral, sends, after connection from the remote device to the communication circuit by communication in compliance with the first standard, the acquisition request for the central a predetermined number of times to the remote device connected with the communication circuit by communication in compliance with the first standard, and when the remote device connected with the communication circuit by communication in compliance with the first standard does not accept the acquisition request for the central, sets the role of the communication circuit with respect to the remote device to the peripheral.

Accordingly, when there is no remote device connected by communication in compliance with the first standard and the number of remote devices connected by communication in compliance with the second standard is less than L+1, the wireless communication device according to the present embodiment can become the peripheral in response to an acquisition request for the central from the remote device at the time of newly connecting to the remote device by communication in compliance with the first standard. In a case of connection from the remote device, the wireless communication device can make an acquisition request for the central a predetermined number of times. As described above, the wireless communication device can stabilize the communication of the remote device, and can prevent the acquisition request for the central among the remote devices from being repeated and the performance of communication of both the wireless communication device and the remote device from being deteriorated.

<Technique 12>

In the wireless communication device according to any of Techniques 1 to 11, the processor, when one of the remote devices is connected with the communication circuit by communication in compliance with the first standard and less than L+1 remote devices and the communication circuit are connected by communication in compliance with the second standard by setting the role of the communication circuit to the peripheral, rejects, after connecting the communication circuit to another new remote device by communication in compliance with the first standard, an acquisition request for the central from the remote device, when one of the remote devices is connected with the communication circuit by communication in compliance with the first standard and less than L+1 remote devices and the communication circuit are connected by communication in compliance with the second standard by setting the role of the communication circuit to the peripheral, sends, after connection by communication in compliance with the first standard from another new remote device, the acquisition request for the central a predetermined number of times to the other remote device, when the other remote device accepts the acquisition request for the central, sets the role of the communication circuit with respect to the remote device to the central, and when the acquisition request for the central is received from the other remote device after the role of the communication circuit is set to the central, rejects the acquisition request for the central from the remote device, and when one of the remote devices is connected with the communication circuit by communication in compliance with the first standard and less than L+1 remote devices and the communication circuit are connected by communication in compliance with the second standard by setting the role of the communication circuit to the peripheral, sends, after connection to the communication circuit by communication in compliance with the first standard from another new remote device, the acquisition request for the central a predetermined number of times to the other new remote device, and when the other remote device does not accept the acquisition request for the central, sets the role of the communication circuit with respect to the remote device to the peripheral.

Accordingly, in a case in which there is already one remote device connected by communication in compliance with the first standard, the wireless communication device according to the present embodiment can be avoided from becoming the peripheral after becoming the central once with respect to a newly connected remote device even when the number of remote devices connected by communication in compliance with the second standard is less than L+1. Accordingly, the wireless communication device can prevent the performance of communication from being deteriorated in communication in the dual mode.

<Technique 13>

In the wireless communication device according to any of Techniques 1 to 12, the first standard is a Bluetooth Classic standard, the second standard is a Bluetooth Low Energy standard, and the first standard and the second standard operate simultaneously in a dual mode in the same device.

Accordingly, the wireless communication device according to the present embodiment can control switching between the central and the peripheral with respect to the remote devices in communication in the dual mode between communication in compliance with the Bluetooth Classic standard and communication in compliance with the Bluetooth Low Energy standard. Accordingly, the wireless communication device can prevent the performance of communication from being deteriorated in the communication in the dual mode in compliance with the two standards described above, and can stabilize the communication of the remote device within a range in which the performance of communication of the own device does not deteriorate.

Although the embodiments have been described above with reference to the accompanying drawings, the present disclosure is not limited to such embodiments. It is apparent to those skilled in the art that various modifications, corrections, substitutions, additions, deletions, and equivalents can be conceived within the scope described in the claims, and it is understood that such modifications, corrections, substitutions, additions, deletions, and equivalents also fall within the technical scope of the present disclosure. In addition, constituent elements in the embodiments described above may be freely combined without departing from the gist of the invention.

INDUSTRIAL APPLICABILITY

A wireless communication device according to the present disclosure is useful as an in-vehicle device, an in-aircraft entertainment system device, a television set, a Blu-ray/DVD recorder, a refrigerator, a washing machine, a vacuum cleaner, a microwave oven, a lighting device, an air conditioner, an air cleaner, a camera, a printer, a projector, a scanner, a fitness device, a vending machine, or a game machine.

CROSS-REFERENCE TO RELATED APPLICATIONS

This application is based on and claims priority under 35 USC 119 from Japanese Patent Application No. 2023-108795 filed on Jun. 30, 2023, the contents of which are incorporated herein by reference.

What is claimed is:

1. A wireless communication device comprising:

a communication circuit that performs communication with a plurality of remote devices that are each operable in a central mode or a peripheral mode, the plurality of remote devices including one or more remote devices connected to the communication circuit;

a memory storing instructions; and a processor that executes the instructions to:

when the one or more remote devices are connected to the communication circuit by communication of a same standard and a number of the one or more remote devices is less than L+1, where L is an integer of 1 or more, accept an acquisition request for the central mode from the one or more remote devices and set a role of the communication circuit with respect to the one or more remote devices to the peripheral mode, and when the one or more remote devices are connected to the communication circuit by communication of the same standard and the number of the one or more remote devices is L+1 or more, reject the acquisition request for the central mode from the one or more remote devices and set the role of the communication circuit with respect to the one or more remote devices to the central mode, wherein the communication circuit performs communication in compliance with a first standard and a second standard in the central mode or the peripheral mode with respect to the plurality of remote devices, the plurality of remote devices includes one or more first remote devices, and the processor executes the instructions to when one of the plurality of remote devices and the communication circuit are connected by communication in compliance with the first standard, and the one or more first remote devices and the communication circuit are connected by communication in compliance with the second standard, and a number of the one or more first remote devices connected to the communication circuit is less than L+1, accept the acquisition request for the central mode from the one of the plurality of remote devices connected with the communication circuit by communication in compliance with the first standard, and set the role of the communication circuit with respect to the one of the plurality of remote devices connected with the communication circuit by communication in compliance with the first standard to the peripheral mode, when one of the plurality of remote devices and the communication circuit are connected by communication in compliance with the first standard, and the one or more first remote devices and the communication circuit are connected by communication in compliance with the second standard, and the number of the one or more first remote devices connected to the communication circuit is L+1 or more, reject the acquisition request for the central mode from the one of the plurality of remote devices connected with the communication circuit by communication in compliance with the first standard, and set the role of the communication circuit with respect to the one of the plurality of remote devices connected with the communication circuit by communication in compliance with the first standard to the central mode, and when two or more of the plurality of remote devices and the communication circuit are connected by communication in compliance with the first standard, reject the acquisition request for the central mode from the two or more of the plurality of remote devices connected by communication in compliance with the first standard, and set the role of the communication circuit with respect to the two or more of the plurality of remote devices connected by communication in compliance with the first standard to the central mode.

2. The wireless communication device according to claim 1, wherein after the communication circuit is connected to at least one of the one or more remote devices from a state in which the communication circuit is not connected to the one or more remote devices, the processor executes the instructions to accept an acquisition request for the central mode from the at least one of the one or more remote devices, and then to control the communication circuit such that the communication circuit does not send the acquisition request for the central mode to the at least one of the one or more remote devices.

3. The wireless communication device according to claim 1, wherein the processor executes the instructions to control the communication circuit to send, after the communication circuit is connected to the one or more remote devices from a state in which the communication circuit is not connected to the one or more remote devices, an acquisition request for the central mode to the one or more remote devices a predetermined number of times, set the role of the communication circuit with respect to the one or more remote devices to the central mode when the one or more remote devices accept the acquisition request, and set the role of the communication circuit with respect to the one or more remote devices to the peripheral mode when at least one of the one or more remote devices do not accept the acquisition request.

4. The wireless communication device according to claim 3, wherein when the acquisition request for the central mode is received from the one or more remote devices after the one or more remote devices accept the acquisition request for the central mode and the role of the communication circuit with respect to the one or more remote devices is set to the central mode, the processor executes the instructions to accept the acquisition request for the central mode from the one or more remote devices.

5. The wireless communication device according to claim 1, wherein after the communication circuit is connected to another remote device from a state in which the one or more remote devices and the communication circuit are connected, the processor executes the instructions to reject the acquisition request for the central mode from the another remote device.

6. The wireless communication device according to claim 1, wherein the processor executes the instructions to after the communication circuit is connected to another remote device from a state in which the one or more remote devices and the communication circuit are connected, control the communication circuit to send the acquisition request for the central mode to the another remote device a predetermined number of times, when the another remote device accepts the acquisition request for the central mode, set the role of the communication circuit with respect to the another remote device to the central mode, and when the another remote device does not accept the acquisition request for the central mode, set the role of the communication circuit with respect to the another remote device to the peripheral mode.

7. The wireless communication device according to claim 6, wherein when the acquisition request for the central mode is received from the another remote device after the another remote device accepts the acquisition request for the central mode and the role of the communication circuit with respect to the another remote device is set to the central mode, the processor executes the instructions to reject the acquisition request for the central mode from the another remote device.

8. The wireless communication device according to claim 1, wherein the communication circuit performs the communication in accordance with a near field communication standard.

9. The wireless communication device according to claim 1, wherein in a situation where none of the plurality of remote devices is connected with the communication circuit by communication in compliance with the first standard, and one or more first remote devices and the communication circuit are connected by communication in compliance with the second standard, and a number of the one or more first remote devices is less than L+1, the processor executes the instructions to accept, when the communication circuit is connected to at least one of the plurality of remote devices by communication in compliance with the first standard, an acquisition request for the central mode from the at least one of the plurality of remote devices connected with the communication circuit by communication in compliance with the first standard, and then control the communication circuit so that the communication circuit does not send the acquisition request for the central mode to the at least one of the plurality of remote devices connected with the communication circuit by communication in compliance with the first standard, send, when the communication circuit is connected to the at least one of the plurality of remote devices by communication in compliance with the first standard, the acquisition request for the central mode a predetermined number of times to the at least one of the plurality of remote device connected to the communication circuit by communication in compliance with the first standard, and when the at least one of the plurality of remote devices connected to the communication circuit by communication in compliance with the first standard accepts the acquisition request for the central mode, set the role of the communication circuit with respect to the at least one of the plurality of remote device to the central mode, and accept, after the role of the communication circuit is set to the central mode, the acquisition request for the central mode from the at least one of the plurality of remote device connected by communication in compliance with the first standard, and send, when the communication circuit is connected from the at least one of the plurality of remote devices by communication in compliance with the first standard, the acquisition request for the central mode a predetermined number of times to the at least one of the plurality of remote devices connected with the communication circuit by communication in compliance with the first standard, and when the at least one of the plurality of remote devices connected with the communication circuit by communication in compliance with the first standard does not accept the acquisition request for the central mode, set the role of the communication circuit with respect to the at least one of the plurality of remote devices to the peripheral mode.

10. The wireless communication device according to claim 1, wherein in a situation where the one of the plurality of remote devices is connected with the communication circuit by communication in compliance with the first standard and the one or more first remote devices and the communication circuit are connected by communication in compliance with the second standard and the number of the one or more first remote devices is less than L+1, the processor executes the instructions to reject, when the communication circuit is connected to another remote device by communication in compliance with the first standard, an acquisition request for the central mode from the another remote device, send, when the communication circuit is connected from the another remote device by communication in compliance with the first standard, the acquisition request for the central mode a predetermined number of times to the another remote device, after the another remote device accepts the acquisition request for the central mode, set the role of the communication circuit with respect to the another remote device to the central mode, and when the acquisition request for the central mode is received from the another remote device after the role of the communication circuit is set to the central mode, reject the acquisition request for the central mode from the another remote device, and send, when the communication circuit is connected from the another remote device by communication in compliance with the first standard, the acquisition request for the central mode a predetermined number of times to the another remote device, and when the another remote device does not accept the acquisition request for the central mode, set the role of the communication circuit with respect to the another remote device to the peripheral mode.

11. The wireless communication device according to claim 1, wherein the first standard is a near field communication standard, the second standard is a low energy near field communication standard, and the first standard and the second standard operate simultaneously in a dual mode in the same device.

12. A wireless communication method comprising:

performing communication in a central mode or a peripheral mode with respect to a plurality of remote devices, the plurality of remote devices including one or more remote devices connected to a communication circuit;

when the one or more remote devices are connected to the communication circuit by a same standard and a number of the one or more remote devices is less than L+1, where L is an integer of 1 or more, accepting an acquisition request for the central mode from the one or more remote devices and setting a role of the communication circuit with respect to the one or more remote devices to the peripheral mode; and when the one or more remote devices are connected to the communication circuit by the same standard and the number of the one or more remote devices is L+1 or more, rejecting the acquisition request for the central mode from the one or more remote devices and setting the role of the communication circuit with respect to the one or more remote devices to the central mode, wherein the communication circuit performs communication in compliance with a first standard and a second standard in the central mode or the peripheral mode with respect to the plurality of remote devices, and in a situation where none of the plurality of remote devices is connected with the communication circuit by communication in compliance with the first standard, one or more first remote devices and the communication circuit are connected by communication in compliance with the second standard, and a number of the one or more first remote devices is less than L+1, the method includes accepting, when the communication circuit is connected to at least one of the plurality of remote devices by communication in compliance with the first standard, an acquisition request for the central mode from the at least one of the plurality of remote devices connected with the communication circuit by communication in compliance with the first standard, and then controlling the communication circuit so that the communication circuit does not send the acquisition request for the central mode to the at least one of the plurality of remote devices connected with the communication circuit by communication in compliance with the first standard, sending, when the communication circuit is connected from the at least one of the plurality of remote devices by communication in compliance with the first standard, the acquisition request for the central mode a predetermined number of times to the at least one of the plurality of remote device connected to the communication circuit by communication in compliance with the first standard, and when the at least one of the plurality of remote devices connected to the communication circuit by communication in compliance with the first standard accepts the acquisition request for the central mode, setting the role of the communication circuit with respect to the at least one of the plurality of remote device to the central mode, and accepting, after the role of the communication circuit is set to the central mode, the acquisition request for the central mode from the at least one of the plurality of remote device connected by communication in compliance with the first standard, and sending, when the communication circuit is connected from the at least one of the plurality of remote devices by communication in compliance with the first standard, the acquisition request for the central mode a predetermined number of times to the at least one of the plurality of remote devices connected with the communication circuit by communication in compliance with the first standard, and when the at least one of the plurality of remote devices connected with the communication circuit by communication in compliance with the first standard does not accept the acquisition request for the central mode, setting the role of the communication circuit with respect to the at least one of the plurality of remote devices to the peripheral mode.

13. A non-transitory computer readable storage medium on which a program is stored, the program for causing a wireless communication device which is a computer to execute processing of performing communication in a central mode or a peripheral mode with respect to a plurality of remote devices, the plurality of remote devices including one or more remote devices connected to a communication circuit;

when the one or more remote devices are connected to the communication circuit by a same standard and a number of the one or more remote devices is less than L+1, where L is an integer of 1 or more, processing of accepting an acquisition request for the central mode from the one or more remote devices and setting a role of the communication circuit with respect to the one or more remote devices to the peripheral mode; and when the one or more remote devices are connected to the communication circuit by communication of the same standard and the number of the one or more remote devices is L+1 or more, processing of rejecting the acquisition request for the central mode from the one or more remote devices and setting the role of the communication circuit with respect to the one or more remote devices to the central mode, wherein after the communication circuit is connected to at least one of the one or more remote devices from a state in which the communication circuit is not connected to the one or more remote devices, the program causes the wireless communication device to execute processing of accepting an acquisition request for the central mode from the at least one of the one or more remote devices, and then controlling the communication circuit such that the communication circuit does not send the acquisition request for the central mode to the at least one of the one or more remote devices.

* * * * *